(12) United States Patent
Akamine et al.

(10) Patent No.: US 11,050,455 B2
(45) Date of Patent: Jun. 29, 2021

(54) RADIO-FREQUENCY SIGNAL SENDING/RECEIVING CIRCUIT AND RADIO-FREQUENCY SIGNAL SENDING/RECEIVING DEVICE

(71) Applicant: Murata Manufacturing Co., Ltd., Kyoto (JP)

(72) Inventors: Hitoshi Akamine, Kyoto (JP); Satoshi Sakurai, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/853,817

(22) Filed: Apr. 21, 2020

(65) Prior Publication Data
US 2020/0343932 A1 Oct. 29, 2020

(30) Foreign Application Priority Data

Apr. 24, 2019 (JP) .............................. JP2019-083360
May 29, 2019 (JP) .............................. JP2019-100499

(51) Int. Cl.
*H04B 1/44* (2006.01)
(52) U.S. Cl.
CPC ...................................... *H04B 1/44* (2013.01)
(58) Field of Classification Search
CPC . H04B 1/40; H04B 1/44; H04B 1/006; H04B 81/0064; H04B 1/1615; H04B 7/0404; H03F 1/26; H03F 3/195; H03F 2200/451; H03H 7/38; H03H 7/46; H03H 9/72
See application file for complete search history.

(56) References Cited

U.S. PATENT DOCUMENTS

| 2009/0098835 | A1  | 4/2009  | Zellweger et al. |
| 2012/0306716 | A1  | 12/2012 | Satake et al. |
| 2016/0336972 | A1* | 11/2016 | Khlat ..................... H04B 1/006 |

(Continued)

FOREIGN PATENT DOCUMENTS

| KR | 10-2008-0098883 A | 11/2008 |
| KR | 10-2008-0113399 A | 12/2008 |
| KR | 10-2012-0107965 A | 10/2012 |

OTHER PUBLICATIONS

R1-1803749, "Remaining issues on SRS", Apr. 16 to 20, 2018, 3GPP TSG RAN WG1 Meeting #92bis.

(Continued)

*Primary Examiner* — Thanh C Le
(74) *Attorney, Agent, or Firm* — Pearne & Gordon LLP

(57) ABSTRACT

A radio-frequency signal sending/receiving circuit includes a low-noise amplifier electrically connected to a first terminal, a first switch electrically connected to the input terminal of the low-noise amplifier, a band pass filter electrically connected at one end to the other end of the first switch and at the other end to a first antenna via a fourth terminal, a power amplifier electrically connected to a second terminal, a second switch electrically connected at one end to the output terminal of the power amplifier and at the other end to the band pass filter, a third switch electrically connected at one end to the output terminal of the power amplifier and at the other end to a fifth terminal, and a fourth switch electrically connected at one end to a third terminal and at the other end to the fifth terminal.

20 Claims, 10 Drawing Sheets

(56) References Cited

U.S. PATENT DOCUMENTS

2018/0048336 A1\* 2/2018 Oshita ................. H04B 7/0404
2020/0007096 A1\* 1/2020 Kita ....................... H04B 1/006
2020/0321997 A1\* 10/2020 Yoshimi .................. H04B 1/40

OTHER PUBLICATIONS

R4-1812719, "Further discussion on additional IL caused by SRS switch", Oct. 8 to 12, 2018, 3GPP TSG-RAN WG4 Meeting #88bis.
Office Action for KR Patent Application No. 10-2020-0035333 dated Feb. 1, 2021.

\* cited by examiner

FIG. 2

| ANTENNA | OPERATION | MODULE M101 ||||||| MODULE M102 |||||||
|---|---|---|---|---|---|---|---|---|---|---|---|---|---|---|
| | | LEFT-SIDE TERMINAL | AMPLIFIER | SWITCH GROUP S101 | BAND PASS FILTER | SWITCH GROUP S102 | RIGHT-SIDE TERMINAL | LEFT-SIDE TERMINAL | SWITCH GROUP S103 | AMPLIFIER | BAND PASS FILTER | SWITCH GROUP S104 | RIGHT-SIDE TERMINAL |
| ANT1 | RECEIVE | R11 | LNA11 | S1-1 | BPF11 | S2-1 | A11 | - | - | - | - | - | - |
| ANT1 | SEND (REGULAR) | T11 | PA11 | S1-2 | BPF11 | S2-1 | A11 | - | - | - | - | - | - |
| ANT1 | SEND (SRS) | T11 | PA11 | S1-2 | BPF11 | S2-1 | A11 | - | - | - | - | - | - |
| ANT2 | RECEIVE | E12 | - | - | - | S2-3 | E11 | R21 | S3-2 | LNA21 | BPF21 | S4-2 | A21 |
| ANT2 | SEND (SRS) | T11 | PA11 | S1-2 | BPF11 | S2-2 | E11 | R21 | S3-1 | - | - | S4-1 | A21 |

| ANTENNA | OPERATION | MODULE M1 | | | | | MODULE M2 | | | | | |
|---|---|---|---|---|---|---|---|---|---|---|---|---|
| | | LEFT-SIDE TERMINAL | AMPLIFIER | SWITCH GROUP S1 | BAND PASS FILTER | RIGHT-SIDE TERMINAL | LEFT-SIDE TERMINAL | SWITCH GROUP S3 | AMPLIFIER | SWITCH GROUP S4 | BAND PASS FILTER | RIGHT-SIDE TERMINAL |
| ANT1 | RECEIVE | R11 | LNA11 | S1-1 | BPF11 | A11 | - | - | - | - | - | - |
| ANT1 | SEND (REGULAR) | T11 | PA11 | S1-2 | BPF11 | A11 | - | - | - | - | - | - |
| ANT1 | SEND (SRS) | T11 | PA11 | S1-2 | BPF11 | A11 | - | - | - | - | - | - |
| ANT2 | RECEIVE | E12 | - | S1-4 | - | E11 | R21 | S3-2 | LNA21 | S4-2 | BPF21 | A21 |
| ANT2 | SEND (SRS) | T11 | PA11 | S1-3 | - | E11 | R21 | S3-1 | - | S4-1 | BPF21 | A21 |

| | COMPARATIVE EXAMPLE | | FIRST EMBODIMENT | | ADVANTAGES OF FIRST EMBODIMENT |
|---|---|---|---|---|---|
| | SRS SENDING PATH | RECEIVING PATH | SRS SENDING PATH | RECEIVING PATH | |
| THE NUMBER OF SWITCHES | 4 | 3 | 3 | 3 | THE SAME NUMBER OF SWITCHES ~71 |
| BAND PASS FILTER THROUGH WHICH SIGNAL PASSES | BPF11 | BPF21 | BPF21 | BPF21 | THE SAME BAND PASS FILTER ~72 |
| SWITCH BETWEEN BPF11 AND A11 | S2-1 REQUIRED | S2-1 REQUIRED | NOT REQUIRED | NOT REQUIRED | PATH LOSS REDUCED ~73 |

| ANTENNA | OPERATION | MODULE M3 ||||| MODULE M2 |||||| MODULE M5 ||||| MODULE M4 |||||| |
|---|---|---|---|---|---|---|---|---|---|---|---|---|---|---|---|---|---|---|---|---|---|---|---|
| | | LEFT-SIDE TERMINAL | AMPLIFIER | SWITCH GROUP S1A | BAND PASS FILTER | RIGHT-SIDE TERMINAL | LEFT-SIDE TERMINAL | SWITCH GROUP S3 | AMPLIFIER | SWITCH GROUP S4 | BAND PASS FILTER | RIGHT-SIDE TERMINAL | LEFT-SIDE TERMINAL | AMPLIFIER | SWITCH GROUP S1A | BAND PASS FILTER | RIGHT-SIDE TERMINAL | LEFT-SIDE TERMINAL | SWITCH GROUP S3 | AMPLIFIER | SWITCH GROUP S4 | BAND PASS FILTER | RIGHT-SIDE TERMINAL |
| ANT1 | RECEIVE | R11 | LNA11 | S1-1 | BPF11 | A11 | - | - | - | - | - | - | - | - | - | - | - | - | - | - | - | - | - |
| ANT1 | SEND (REGULAR) | T11 | PA11 | S1-2 | BPF11 | A11 | - | - | - | - | - | - | - | - | - | - | - | - | - | - | - | - | - |
| ANT1 | SEND (SRS) | T11 | PA11 | S1-2 | BPF11 | A11 | - | - | - | - | - | - | - | - | - | - | - | - | - | - | - | - | - |
| ANT2 | RECEIVE | E12 | - | S1-4 | - | E11 | R21 | S3-2 | LNA21 | S4-2 | BPF21 | A21 | - | - | - | - | - | - | - | - | - | - | - |
| ANT2 | SEND (SRS) | T11 | PA11 | S1-3 | - | E11 | R21 | S3-1 | - | S4-1 | BPF21 | A21 | - | - | - | - | - | - | - | - | - | - | - |
| ANT3 | RECEIVE | - | - | - | - | - | - | - | - | - | - | - | R11 | LNA11 | S1-1 | BPF11 | A11 | - | - | - | - | - | - |
| ANT3 | SEND (SRS) | T11 | PA11 | S1-8 | - | E13 | - | - | - | - | - | - | E14 | - | S1-6 | BPF11 | A11 | - | - | - | - | - | - |
| ANT4 | RECEIVE | - | - | - | - | - | - | - | - | - | - | - | E12 | - | S1-4 | - | E11 | R21 | S3-2 | LNA21 | S4-2 | BPF21 | A21 |
| ANT4 | SEND (SRS) | T11 | PA11 | S1-8 | - | E13 | - | - | - | - | - | - | E14 | - | S1-5 | - | E11 | R21 | S3-1 | - | S4-1 | BPF21 | A21 |

FIG. 9

| ANTENNA | OPERATION | MODULE M3 ||||| MODULE M2 |||||| MODULE M6 |||||| MODULE M4 ||||||
|---|---|---|---|---|---|---|---|---|---|---|---|---|---|---|---|---|---|---|---|---|---|---|---|---|
| | | LEFT-SIDE TERMINAL | AMPLIFIER | SWITCH GROUP S1A | BAND PASS FILTER | RIGHT-SIDE TERMINAL | LEFT-SIDE TERMINAL | AMPLIFIER | SWITCH GROUP S3 | SWITCH GROUP S4 | BAND PASS FILTER | RIGHT-SIDE TERMINAL | LEFT-SIDE TERMINAL | SWITCH GROUP S3B | AMPLIFIER | SWITCH GROUP S4 | BAND PASS FILTER | RIGHT-SIDE TERMINAL | LEFT-SIDE TERMINAL | SWITCH GROUP S3 | AMPLIFIER | SWITCH GROUP S4 | BAND PASS FILTER | RIGHT-SIDE TERMINAL |
| ANT1 | RECEIVE | R11 | LNA11 | S1-1 | BPF11 | A11 | - | - | - | - | - | - | - | - | - | - | - | - | - | - | - | - | - | - |
| ANT1 | SEND (REGULAR) | T11 | PA11 | S1-2 | BPF11 | A11 | - | - | - | - | - | - | - | - | - | - | - | - | - | - | - | - | - | - |
| ANT1 | SEND (SRS) | T11 | PA11 | S1-2 | BPF11 | A11 | - | - | - | - | - | - | - | - | - | - | - | - | - | - | - | - | - | - |
| ANT2 | RECEIVE | E12 | - | S1-4 | - | E11 | R21 | LNA21 | S3-2 | S4-2 | BPF21 | A21 | - | - | - | - | - | - | - | - | - | - | - | - |
| ANT2 | SEND (SRS) | T11 | PA11 | S1-3 | - | E11 | R21 | - | S3-1 | S4-1 | BPF21 | A21 | - | - | - | - | - | - | - | - | - | - | - | - |
| ANT3 | RECEIVE | - | - | - | - | - | - | - | - | - | - | - | R11 | S3-2 | LNA21 | S4-2 | BPF21 | A11 | - | - | - | - | - | - |
| ANT3 | SEND (SRS) | T11 | PA11 | S1-8 | - | E13 | - | - | - | - | - | - | E14 | S3-5 | - | - | BPF21 | A11 | - | - | - | - | - | - |
| ANT4 | RECEIVE | - | - | - | - | - | - | - | - | - | - | - | E12 | S3-3 | - | - | - | E11 | R21 | S3-2 | LNA21 | S4-2 | BPF21 | A21 |
| ANT4 | SEND (SRS) | T11 | PA11 | S1-8 | - | E13 | - | - | - | - | - | - | E14 | S3-4 | - | - | - | E11 | R21 | S3-1 | - | S4-1 | BPF21 | A21 |

60; 61, 62, 63, 64, 65, 66, 67, 68, 69

RADIO-FREQUENCY SIGNAL SENDING/RECEIVING CIRCUIT AND RADIO-FREQUENCY SIGNAL SENDING/RECEIVING DEVICE

This application claims priority from Japanese Patent Application No. 2019-100499 filed on May 29, 2019 and Japanese Patent Application No. 2019-083360 filed on Apr. 24, 2019. The contents of these applications are incorporated herein by reference in their entireties.

BACKGROUND

The present disclosure relates to a radio-frequency signal sending/receiving circuit and a radio-frequency signal sending/receiving device. In a mobile communication apparatus, such as a cellular phone, sound reference signaling (SRS) is conducted. SRS refers to monitoring of power and delay in a transmission path between each antenna port within the mobile communication apparatus and a base station.

"Remaining issues on SRS", [online], Apr. 16 to 20, 2018, 3GPP TSG RAN WG1 Meeting #92bis R1-1803749, [Searched on Mar. 29, 2019], Internet, describes SRS in the configuration with one transmit antenna and two receive antennas (hereinafter called "1T2R"), the configuration with two transmit antennas and four receive antennas (hereinafter called "2T4R"), and the configuration with one transmit antenna and four receive antennas (hereinafter called "1T4R").

BRIEF SUMMARY

If, within a mobile communication apparatus, the path loss (electrical characteristics) in a transmission path including components such as a band pass filter and a switch through which an SRS sending signal is transmitted and that in a transmission path including similar components through which a received signal is transmitted are significantly different, the mobile communication apparatus fails to conduct high-precision SRS.

The present disclosure conducts high-precision SRS. According to an aspect of the present disclosure, there is provided a radio-frequency signal sending/receiving circuit including first through fifth terminals, first through fourth switches, a low-noise amplifier, a band pass filter, and a power amplifier. An output terminal of the low-noise amplifier is electrically connected to the first terminal. One end of the first switch is electrically connected to an input terminal of the low-noise amplifier. One end of the band pass filter is electrically connected to the other end of the first switch, and the other end of the band pass filter is electrically connected to a first antenna via the fourth terminal. An input terminal of the power amplifier is electrically connected to the second terminal. One end of the second switch is electrically connected to an output terminal of the power amplifier, and the other end of the second switch is electrically connected to one end of the band pass filter. One end of the third switch is electrically connected to the output terminal of the power amplifier, and the other end of the third switch is electrically connected to the fifth terminal. One end of the fourth switch is electrically connected to the third terminal, and the other end of the fourth switch is electrically connected to the fifth terminal.

According to an aspect of the present disclosure, there is provided a radio-frequency signal sending/receiving circuit including first and second terminals, first through fourth switches, a band pass filter, and a low-noise amplifier. One end of the first switch is electrically connected to the first terminal. One end of the second switch is electrically connected to the first terminal. One end of the third switch is electrically connected to the other end of the first switch. One end of the band pass filter is electrically connected to the other end of the third switch, and the other end of the band pass filter is electrically connected to a second antenna via the second terminal. An output terminal of the low-noise amplifier is electrically connected to the other end of the second switch. One end of the fourth switch is electrically connected to an input terminal of the low-noise amplifier, and the other end of the fourth switch is electrically connected to one end of the band pass filter.

According to an aspect of the present disclosure, there is provided a radio-frequency signal sending/receiving device including first and second radio-frequency signal sending/receiving circuits. The first radio-frequency signal sending/receiving circuit includes first through fifth terminals, first through fourth switches, a low-noise amplifier, a band pass filter, and a power amplifier. An output terminal of the low-noise amplifier is electrically connected to the first terminal. One end of the first switch is electrically connected to an input terminal of the low-noise amplifier. One end of the band pass filter is electrically connected to the other end of the first switch, and the other end of the band pass filter is electrically connected to a first antenna via the fourth terminal. An input terminal of the power amplifier is electrically connected to the second terminal. One end of the second switch is electrically connected to an output terminal of the power amplifier, and the other end of the second switch is electrically connected to one end of the band pass filter. One end of the third switch is electrically connected to the output terminal of the power amplifier, and the other end of the third switch is electrically connected to the fifth terminal. One end of the fourth switch is electrically connected to the third terminal, and the other end of the fourth switch is electrically connected to the fifth terminal. The second radio-frequency signal sending/receiving circuit includes first and second terminals, first through fourth switches, a band pass filter, and a low-noise amplifier. One end of the first switch is electrically connected to the first terminal. One end of the second switch is electrically connected to the first terminal. One end of the third switch is electrically connected to the other end of the first switch. One end of the band pass filter is electrically connected to the other end of the third switch, and the other end of the band pass filter is electrically connected to a second antenna via the second terminal. An output terminal of the low-noise amplifier is electrically connected to the other end of the second switch. One end of the fourth switch is electrically connected to an input terminal of the low-noise amplifier, and the other end of the fourth switch is electrically connected to one end of the band pass filter. The fifth terminal of the first radio-frequency signal sending/receiving circuit and the first terminal of the second radio-frequency signal sending/receiving circuit are electrically connected to each other.

According to an aspect of the present disclosure, there is provided a radio-frequency signal sending/receiving device including first through fourth radio-frequency signal sending/receiving circuits. Each of the first and third radio-frequency signal sending/receiving circuits includes first through seventh terminals, first through seventh switches, a low-noise amplifier, a band pass filter, and a power amplifier. An output terminal of the low-noise amplifier is electrically connected to the first terminal. One end of the first switch is electrically connected to an input terminal of the low-noise amplifier. One end of the band pass filter is electrically connected to the other end of the first switch, and the other end of the band pass filter is electrically connected to the fourth terminal. An input terminal of the power amplifier is electrically connected to the second terminal. One end of the second switch is electrically connected to an output terminal of the power amplifier, and the other end of the second switch is electrically connected to one end of the band pass filter. One end of the third switch is electrically connected to the output terminal of the power amplifier, and the other end of the third switch is electrically connected to the fifth terminal. One end of the fourth switch is electrically connected to the third terminal, and the other end of the fourth switch is electrically connected to the fifth terminal. One end of the fifth switch is electrically connected to the sixth terminal, and the other end of the fifth switch is electrically connected to the fifth terminal. One end of the sixth switch is electrically connected to the sixth terminal, and the other end of the sixth switch is electrically connected to one end of the band pass filter. One end of the seventh switch is electrically connected to the output terminal of the power amplifier, and the other end of the seventh switch is electrically connected to the seventh terminal. Each of the second and fourth radio-frequency signal sending/receiving circuits includes first and second terminals, first through fourth switches, a band pass filter, and a low-noise amplifier. One end of the first switch is electrically connected to the first terminal. One end of the second switch is electrically connected to the first terminal. One end of the third switch is electrically connected to the other end of the first switch. One end of the band pass filter is electrically connected to the other end of the third switch, and the other end of the band pass filter is electrically connected to the second terminal. An output terminal of the low-noise amplifier is electrically connected to the other end of the second switch. One end of the fourth switch is electrically connected to an input terminal of the low-noise amplifier, and the other end of the fourth switch is electrically connected to one end of the band pass filter. The fourth terminal of the first radio-frequency signal sending/receiving circuit is electrically connected to a first antenna. The second terminal of the second radio-frequency signal sending/receiving circuit is electrically connected to a second antenna. The fourth terminal of the third radio-frequency signal sending/receiving circuit is electrically connected to a third antenna. The second terminal of the fourth radio-frequency signal sending/receiving circuit is electrically connected to a fourth antenna. The fifth terminal of the first radio-frequency signal sending/receiving circuit and the first terminal of the second radio-frequency signal sending/receiving circuit are electrically connected to each other. The seventh terminal of the first radio-frequency signal sending/receiving circuit and the sixth terminal of the third radio-frequency signal sending/receiving circuit are electrically connected to each other. The fifth terminal of the third radio-frequency signal sending/receiving circuit and the first terminal of the fourth radio-frequency signal sending/receiving circuit are electrically connected to each other.

According to an aspect of the present disclosure, there is provided a radio-frequency signal sending/receiving device including first through fourth radio-frequency signal sending/receiving circuits. The first radio-frequency signal sending/receiving circuit includes first through seventh terminals, first through seventh switches, a low-noise amplifier, a band pass filter, and a power amplifier. An output terminal of the low-noise amplifier is electrically connected to the first terminal. One end of the first switch is electrically connected to an input terminal of the low-noise amplifier. One end of the band pass filter is electrically connected to the other end of the first switch, and the other end of the band pass filter is electrically connected to the fourth terminal. An input terminal of the power amplifier is electrically connected to the second terminal. One end of the second switch is electrically connected to an output terminal of the power amplifier, and the other end of the second switch is electrically connected to one end of the band pass filter. One end of the third switch is electrically connected to the output terminal of the power amplifier, and the other end of the third switch is electrically connected to the fifth terminal. One end of the fourth switch is electrically connected to the third terminal, and the other end of the fourth switch is electrically connected to the fifth terminal. One end of the fifth switch is electrically connected to the sixth terminal, and the other end of the fifth switch is electrically connected to the fifth terminal. One end of the sixth switch is electrically connected to the sixth terminal, and the other end of the sixth switch is electrically connected to one end of the band pass filter. One end of the seventh switch is electrically connected to the output terminal of the power amplifier, and the other end of the seventh switch is electrically connected to the seventh terminal. Each of the second and fourth radio-frequency signal sending/receiving circuits includes first and second terminals, first through fourth switches, a band pass filter, and a low-noise amplifier. One end of the first switch is electrically connected to the first terminal. One end of the second switch is electrically connected to the first terminal. One end of the third switch is electrically connected to the other end of the first switch. One end of the band pass filter is electrically connected to the other end of the third switch, and the other end of the band pass filter is electrically connected to the second terminal. An output terminal of the low-noise amplifier is electrically connected to the other end of the second switch. One end of the fourth switch is electrically connected to an input terminal of the low-noise amplifier, and the other end of the fourth switch is electrically connected to one end of the band pass filter. The third radio-frequency signal sending/receiving circuit includes first through fifth terminals, first through seventh switches, a band pass filter, and a low-noise amplifier. One end of the first switch is electrically connected to the first terminal. One end of the second switch is electrically connected to the first terminal. One end of the third switch is electrically connected to the other end of the first switch. One end of the band pass filter is electrically connected to the other end of the third switch, and the other end of the band pass filter is electrically connected to the second terminal. An output terminal of the low-noise amplifier is electrically connected to the other end of the second switch. One end of the fourth switch is electrically connected to an input terminal of the low-noise amplifier, and the other end of the fourth switch is electrically connected to one end of the band pass filter. One end of the fifth switch is electrically connected to the third terminal, and the other end of the fifth switch is electrically connected to the fifth terminal. One end of the sixth switch is electrically connected to the fourth terminal, and the other end of the sixth switch is electrically connected to the fifth terminal. One end of the seventh switch is electrically connected to the fourth terminal, and the other end of the seventh switch is electrically connected to one end of the band pass filter. The fourth terminal of the first radio-frequency signal sending/receiving circuit is electrically connected to a first antenna. The second terminal of the second radio-frequency signal sending/receiving circuit is electrically connected to a second antenna. The second terminal of the third radio-frequency signal sending/receiving circuit is electrically connected to a third antenna. The second terminal of the fourth radio-frequency signal sending/receiving circuit is electrically connected to a fourth antenna. The fifth terminal of the first radio-frequency signal sending/receiving circuit and the first terminal of the second radio-frequency signal sending/receiving circuit are electrically connected to each other. The seventh terminal of the first radio-frequency signal sending/receiving circuit and the fourth terminal of the third radio-frequency signal sending/receiving circuit are electrically connected to each other. The fifth terminal of the third radio-frequency signal sending/receiving circuit and the first terminal of the fourth radio-frequency signal sending/receiving circuit are electrically connected to each other.

According to embodiments of the present disclosure, it is possible to conduct high-precision SRS.

Other features, elements, characteristics and advantages of the present disclosure will become more apparent from the following detailed description of embodiments of the present disclosure with reference to the attached drawings.

BRIEF DESCRIPTION OF THE SEVERAL VIEWS OF THE DRAWINGS

FIG. 2 illustrates a table for explaining the operation of the radio-frequency signal sending/receiving device according to the comparative example;

FIG. 4 illustrates a table for explaining the operation of the radio-frequency signal sending/receiving device according to the first embodiment;

FIG. 5 illustrates a table indicating comparison between the comparative example and the first embodiment;

FIG. 7 illustrates a table for explaining the operation of the radio-frequency signal sending/receiving device according to the second embodiment;

FIG. 9 illustrates a table for explaining the operation of the radio-frequency signal sending/receiving device according to the third embodiment.

DETAILED DESCRIPTION

A radio-frequency signal sending/receiving circuit and a radio-frequency signal sending/receiving device according to the embodiments of the disclosure will be described below in detail with reference to the accompanying drawings. The embodiments are not intended to be exhaustive or to limit the disclosure to the precise forms disclosed. The embodiments are only examples, and the configurations described in the embodiments may partially be replaced by or combined with each other. Second through fourth embodiments will be discussed mainly by referring to points different from a first embodiment while omitting the same points as the first embodiment. Similar advantages obtained by similar configurations will not be repeated.

First Embodiment

The first embodiment will be described below. For the sake of facilitating the understanding of the first embodiment, a comparative example will first be discussed below.
(Comparative Example)

Figure 1:
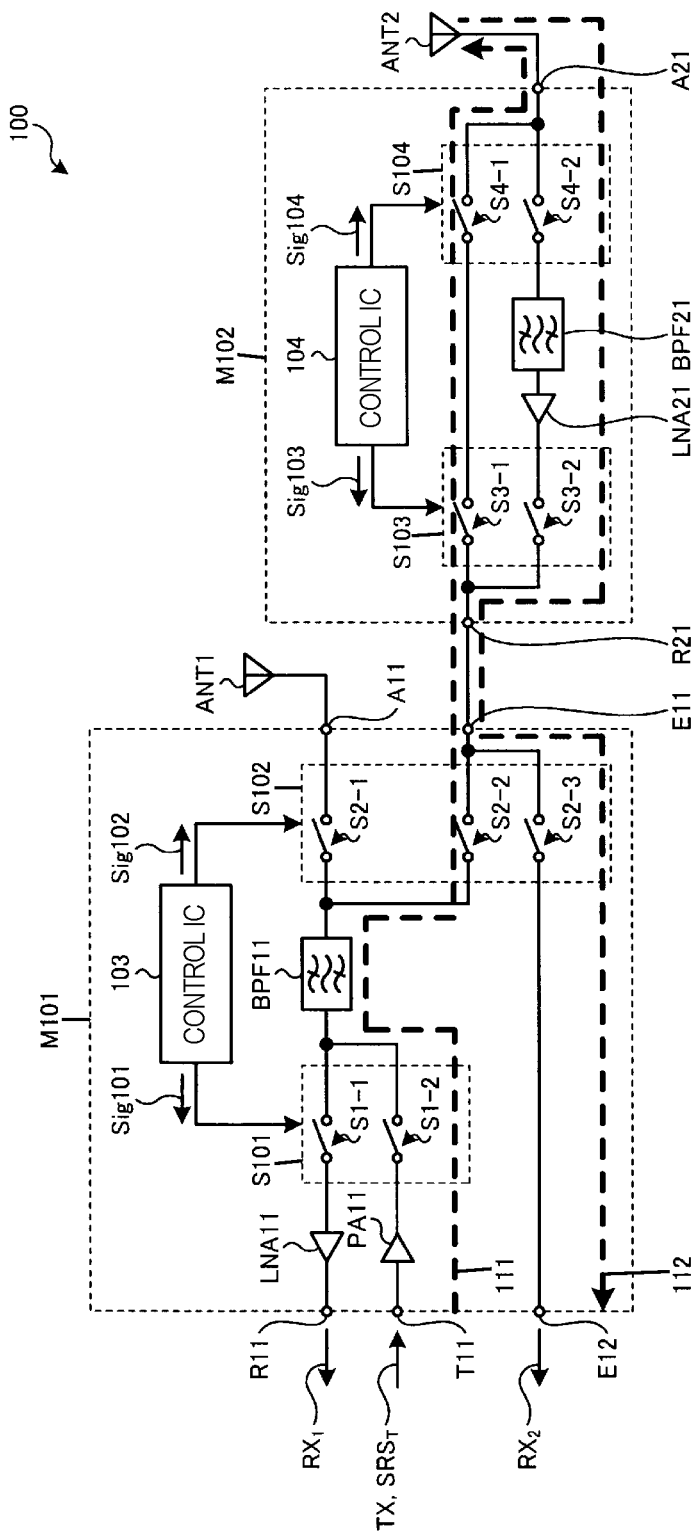
FIG. 1 is a circuit diagram of a radio-frequency signal sending/receiving device according to a comparative example.

FIG. 1 is a circuit diagram of a radio-frequency signal sending/receiving device 100 according to a comparative example. The radio-frequency signal sending/receiving device 100 includes modules M101 and M102. The module M101 is electrically connected to an antenna ANT1, while the module M102 is electrically connected to an antenna ANT2.

In regular communication, the radio-frequency signal sending/receiving device 100 sends radio waves by using the antenna ANT1 and receives radio waves by using the antennas ANT1 and ANT2. That is, the radio-frequency signal sending/receiving device 100 supports 1T2R. Providing two radio-frequency signal sending/receiving devices 100 makes it possible to support 2T4R.

In the present disclosure, regular communication refers to communication handling user data and sound, for example, that is, communication other than sound reference signaling (SRS) communication.

In SRS communication, the radio-frequency signal sending/receiving device 100 sends radio waves by using each of the antennas ANT1 and ANT2. In regular communication, the antenna ANT2 is used for reception only. In SRS communication, however, a sending signal output from a power amplifier PA11 is sent from the antenna ANT2 so as to monitor the communication status and loss between the antenna ANT2 and a base station.

The module M101 includes terminals R11, T11, E12, A11, and E11, a low-noise amplifier LNA11, the power amplifier PA11, a switch group S101, a band pass filter BPF 11, a switch group S102, and a control integrated circuit (IC) 103. The switch group S101 includes switches S1-1 and S1-2. The switch group S102 includes switches S2-1, S2-2, and S2-3.

The output terminal of the low-noise amplifier LNA11 is electrically connected to the terminal R11. The input terminal of the low-noise amplifier LNA11 is electrically connected to one end of the switch S1-1. The other end of the switch S1-1 is electrically connected to one end of the band pass filter BPF11.

The input terminal of the power amplifier PA11 is electrically connected to the terminal T11. The output terminal of the power amplifier PA11 is electrically connected to one end of the switch S1-2. The other end of the switch S1-2 is electrically connected to one end of the band pass filter BPF11.

The other end of the band pass filter BPF11 is electrically connected to one end of the switch S2-1 and one end of the switch S2-2. The other end of the switch S2-1 is electrically connected to the terminal A11. The terminal A11 is electrically connected to the antenna ANT1. The other end of the switch S2-2 is electrically connected to the terminal E11.

One end of the switch S2-3 is electrically connected to the terminal E12, and the other end thereof is electrically connected to the terminal E11.

The switches S1-1 and S1-2 of the switch group S101 are individually turned ON or OFF in accordance with a control signal Sig101 output from the control IC 103. The switches S2-1, S2-2, and S2-3 of the switch group S102 are individually turned ON or OFF in accordance with a control signal Sig102 output from the control IC 103.

The module M102 includes terminals R21 and A21, a switch group S103, a low-noise amplifier LNA21, a band pass filter BPF21, a switch group S104, and a control IC 104. The switch group S103 includes switches S3-1 and S3-2, while the switch group S104 includes switches S4-1 and S4-2.

The pass band of the band pass filter BPF21 is the same as that of the band pass filter BPF11. However, the disclosure is not restricted to this configuration.

One end of the switch S3-1 is electrically connected to the terminal R21, and the other end thereof is electrically connected to one end of the switch S4-1. The other end of the switch S4-1 is electrically connected to the terminal A21.

One end of the switch S3-2 is electrically connected to the terminal R21, and the other end thereof is electrically connected to the output terminal of the low-noise amplifier LNA21. The input terminal of the low-noise amplifier LNA21 is electrically connected to one end of the band pass filter BPF21. The other end of the band pass filter BPF21 is electrically connected to one end of the switch S4-2. The other end of the switch S4-2 is electrically connected to the terminal A21. The terminal A21 is electrically connected to the antenna ANT2.

The switches S3-1 and S3-2 of the switch group S103 are individually turned ON or OFF in accordance with a control signal Sig103 output from the control IC 104. The switches S4-1 and S4-2 of the switch group S104 are individually turned ON or OFF in accordance with a control signal Sig104 output from the control IC 104.

FIG. 2 illustrates a table 120 for explaining the operation of the radio-frequency signal sending/receiving device 100 according to the comparative example. More specifically, the table 120 shows the components within the modules M101 and M102 through which a radio-frequency signal is transmitted in each of (T) sending operation and receiving operation (R).

(T) Sending operation includes the cases of:
(T-1-1) sending by the antenna ANT1 (regular);
(T-1-2) sending by the antenna ANT1 (SRS); and
(T-2) sending by the antenna ANT2 (SRS).
(R) Receiving operation includes the cases of:
(R-1) receiving by the antenna ANT1 (regular); and
(R-2) receiving by the antenna ANT2 (regular).

The case of (T-1-1) sending by the antenna ANT1 (regular) will be discussed below. A second row 122 of the table 120 shows the components within the module M101 through which a radio-frequency sending signal TX is transmitted to be sent by the antenna ANT1 (regular).

When sending the radio-frequency sending signal TX by the antenna ANT1 (regular), the switch S1-1 is OFF and the switch S1-2 is ON in accordance with the control signal Sig101, while the switch S2-1 is ON and the switches S2-2 and S2-3 are OFF in accordance with the control signal Sig102.

The radio-frequency sending signal TX is input into the terminal T11 on the left side of the module M101. The power amplifier PA11 amplifies the radio-frequency sending signal TX and outputs it to one end of the switch S1-2. After passing through the switch S1-2, the radio-frequency sending signal TX is input into the band pass filter BPF11. The band pass filter BPF11 allows the radio-frequency sending signal TX to pass therethrough. The radio-frequency sending signal TX is then input into one end of the switch S2-1. After passing through the switch S2-1, the radio-frequency sending signal TX is output to the antenna ANT1 via the terminal A11 on the right side of the module M101.

The case of (T-1-2) sending by the antenna ANT1 (SRS) is similar to the case of (T-1-1) sending by the antenna ANT1 (regular), and a detailed explanation thereof will be omitted. A third row 123 of the table 120 shows the components within the module M101 through which an SRS sending signal $SRS_T$ is transmitted to be sent by the antenna ANT1 (SRS).

The case of (T-2) sending by the antenna ANT2 (SRS) will be discussed below. A fifth row 125 of the table 120 shows the components within the modules M101 and M102 through which an SRS sending signal $SRS_T$ is transmitted to be sent by the antenna ANT2 (SRS).

When sending the SRS sending signal $SRS_T$ by the antenna ANT2 (SRS), in the module M101, the switch S1-1 is OFF and the switch S1-2 is ON in accordance with the control signal Sig101, while the switches S2-1 and S2-3 are OFF and the switch S2-2 is ON in accordance with the control signal Sig102. In the module M102, the switch S3-1 is ON and the switch S3-2 is OFF in accordance with the control signal Sig103, while the switch S4-1 is ON and the switch S4-2 is OFF in accordance with the control signal Sig104.

An SRS sending signal $SRS_T$ is input into the terminal T11 on the left side of the module M101. The power amplifier PA11 amplifies the SRS sending signal $SRS_T$ and outputs it to one end of the switch S1-2. After passing through the switch S1-2, the SRS sending signal $SRS_T$ is input into the band pass filter BPF11. The band pass filter BPF11 allows the SRS sending signal $SRS_T$ to pass therethrough. The SRS sending signal $SRS_T$ is then input into one end of the switch S2-2. After passing through the switch S2-2, the SRS sending signal $SRS_T$ is input into one end of the switch S3-1 in the module M102 via the terminal E11 on the right side of the module M101 and the terminal R21 on the left side of the module M102. After passing through the switch S3-1, the SRS sending signal $SRS_T$ is input into one end of the switch S4-1. After passing through the switch S4-1, the SRS sending signal $SRS_T$ is output to the antenna ANT2 via the terminal A21 on the right side of the module M102.

An arrow 111 in FIG. 1 indicates the transmission path through which the SRS sending signal $SRS_T$ is transmitted. As indicated by the arrow 111, the SRS sending signal $SRS_T$ is transmitted in order of terminal T11→power amplifier PA11→switch S1-2→band pass filter BPF11→switch S2-2→terminal E11→terminal R21→switch S3-1→switch S4-1→terminal A21→antenna ANT2.

The case of (R-1) receiving by the antenna ANT1 (regular) will be discussed below. A first row 121 of the table 120 shows the components within the module M101 through which a radio-frequency received signal $RX_1$ received by the antenna ANT1 (regular) is transmitted.

When the radio-frequency received signal $RX_1$ is received by the antenna ANT1 (regular), the switch S1-1 is ON and the switch S1-2 is OFF in accordance with the control signal Sig101, while the switch S2-1 is ON and the switches S2-2 and S2-3 are OFF in accordance with the control signal Sig102.

The radio-frequency received signal $RX_1$ is input from the antenna ANT1 into the other end of the switch S2-1 via the terminal A11 on the right side of the module M101. After passing through the switch S2-1, the radio-frequency received signal $RX_1$ is input into the band pass filter BPF11. The band pass filter BPF11 allows the radio-frequency received signal $RX_1$ to pass therethrough. The radio-frequency received signal $RX_1$ is then input into the other end of the switch S1-1. After passing through the switch S1-1, the radio-frequency received signal $RX_1$ is input into the low-noise amplifier LNA11. The low-noise amplifier LNA11 amplifies the radio-frequency received signal $RX_1$ and outputs it via the terminal R11 on the left side of the module M101.

The case of (R-2) receiving by the antenna ANT2 (regular) will be discussed below. A fourth row 124 of the table 120 shows the components within the modules M101 and M102 through which a radio-frequency received signal $RX_2$ received by the antenna ANT2 (regular) is transmitted.

When the radio-frequency received signal $RX_2$ is received by the antenna ANT2 (regular), in the module M101, the switches S1-1 and S1-2 are OFF in accordance with the control signal Sig101, while the switches S2-1 and S2-2 are OFF and the switch S2-3 is ON in accordance with the control signal Sig102. In the module M102, the switch S3-1 is OFF and the switch S3-2 is ON in accordance with the control signal Sig103, while the switch S4-1 is OFF and the switch S4-2 is ON in accordance with the control signal Sig104.

The radio-frequency received signal $RX_2$ is input from the antenna ANT2 into the other end of the switch S4-2 via the terminal A21 on the right side of the module M102. After passing through the switch S4-2, the radio-frequency received signal $RX_2$ is input into the band pass filter BPF21. The band pass filter BPF21 allows the radio-frequency received signal $RX_2$ to pass therethrough. The radio-frequency received signal $RX_2$ is then input into the input terminal of the low-noise amplifier LNA21. The low-noise amplifier LNA21 amplifies the radio-frequency received signal $RX_2$ and outputs it to the other end of the switch S3-2. After passing through the switch S3-2, the radio-frequency received signal $RX_2$ is input into the other end of the switch S2-3 in the module M101 via the terminal R21 on the left side of the module M102 and the terminal E11 on the right side of the module M101. After passing through the switch S2-3, the radio-frequency received signal $RX_2$ is output via the terminal E12 on the left side of the module M101.

An arrow 112 in FIG. 1 indicates the transmission path through which the radio-frequency received signal $RX_2$ is transmitted. As indicated by the arrow 112, the radio-frequency received signal $RX_2$ is transmitted in order of antenna ANT2→terminal A21→switch S4-2→band pass filter BPF21→low-noise amplifier LNA21→switch S3-2→terminal R21→terminal E11→switch S2-3→terminal E12.

First Embodiment

Figure 3:
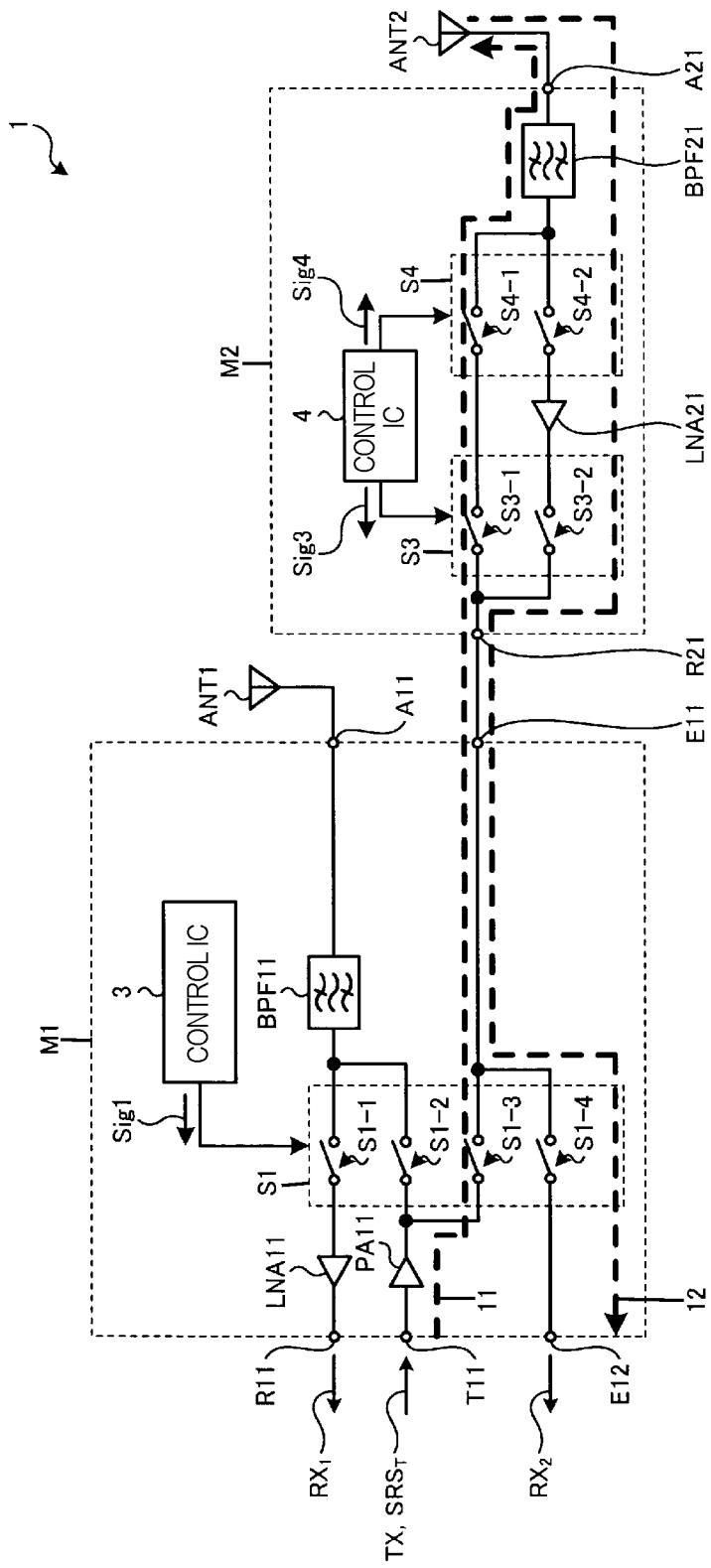
FIG. 3 is a circuit diagram illustrating a radio-frequency signal sending/receiving device according to a first embodiment.

FIG. 3 is a circuit diagram illustrating a radio-frequency signal sending/receiving device 1 according to the first embodiment. The radio-frequency signal sending/receiving device 1 includes modules M1 and M2.

Elements of the radio-frequency signal sending/receiving device 1 identical to those of the radio-frequency signal sending/receiving device 100 of the comparative example are designated by like reference numerals, and an explanation thereof will be omitted.

The module M1 is electrically connected to the antenna ANT1, while the module M2 is electrically connected to the antenna ANT2.

The antenna ANT1 corresponds to a first antenna of an embodiment of the disclosure, while the antenna ANT2 corresponds to a second antenna of an embodiment of the disclosure.

Each of the modules M1 and M2 corresponds to a radio-frequency signal sending/receiving circuit of an embodiment of the disclosure.

In regular communication, the radio-frequency signal sending/receiving device 1 sends radio waves by using the antenna ANT1 and receives radio waves by using the antennas ANT1 and ANT2. That is, the radio-frequency signal sending/receiving device 1 supports 1T2R. Providing two radio-frequency signal sending/receiving devices 1 makes it possible to support 2T4R.

In the present disclosure, regular communication refers to communication handling user data and sound, for example, that is, communication other than SRS communication.

In SRS communication, the radio-frequency signal sending/receiving device 1 sends radio waves by using each of the antennas ANT1 and ANT2.

The module M1 includes a switch group S1 instead of the switch group S101 (see FIG. 1). The switch group S1 includes switches S1-3 and S1-4 in addition to the switches S1-1 and S1-2 included in the switch group S101.

One end of the switch S1-3 is electrically connected to the output terminal of the power amplifier PA11, and the other end thereof is electrically connected to the terminal E11.

One end of the switch S1-4 is electrically connected to the terminal E12, and the other end thereof is electrically connected to the terminal E11.

The switches S1-1 through S1-4 of the switch group S1 are individually turned ON or OFF in accordance with a control signal Sig1 output from a control IC 3.

The other end of the band pass filter BPF11 is electrically connected to the terminal A11. That is, unlike the module M101 (see FIG. 1), the module M1 does not include the switch group S102.

In the module M1, the terminal R11 corresponds to a first terminal of an embodiment of the disclosure, the terminal T11 corresponds to a second terminal of an embodiment of the disclosure, the terminal E12 corresponds to a third terminal of an embodiment of the disclosure, the terminal A11 corresponds to a fourth terminal of an embodiment of the disclosure, and the terminal E11 corresponds to a fifth terminal of an embodiment of the disclosure. In the module M1, the switches S1-1, S1-2, S1-3, and S1-4 respectively correspond to first, second, third, and fourth switches of an embodiment of the disclosure.

In the module M2, the other end of the switch S4-1 is electrically connected to one end of the band pass filter BPF21.

One end of the switch S4-2 is electrically connected to the input terminal of the low-noise amplifier LNA21, and the other end thereof is electrically connected to one end of the band pass filter BPF21.

The other end of the band pass filter BPF21 is electrically connected to the terminal A21.

The switches S3-1 and S3-2 are individually turned ON or OFF in accordance with a control signal Sig3 output from a control IC 4. The switches S4-1 and S4-2 are individually turned ON or OFF in accordance with a control signal Sig4 output from the control IC 4.

In the module M2, the terminal R21 corresponds to a first terminal of an embodiment of the disclosure, and the terminal A21 corresponds to a second terminal of an embodiment of the disclosure. In the module M2, the switches S3-1 and S3-2 respectively correspond to first and second switches of an embodiment of the disclosure, and the switches S4-1 and S4-2 respectively correspond to third and fourth switches of an embodiment of the disclosure.

The pass band of the band pass filter BPF21 is the same as that of the band pass filter BPF11. However, the disclosure is not restricted to this configuration.

The band pass filter BPF11 is constituted by one or multiple inductors and one or multiple capacitors by way of example. However, the disclosure is not restricted to this configuration. The band pass filter BPF11 may be a surface acoustic wave (SAW) filter, a bulk acoustic wave (BAW) filter, a dielectric filter, or a distributed-element filter. The band pass filter BPF11 may be formed on a single substrate, though the disclosure is not limited to this configuration. The low-noise amplifier LNA11 is formed on a single semiconductor chip (die), and may be mounted on the substrate on which the band pass filter BPF11 is formed, though the disclosure is not limited to this configuration. The power amplifier PA11 is formed on another semiconductor chip, and may be mounted on the substrate on which the band pass filter BPF11 is formed, though the disclosure is not limited to this configuration. The switch group S1 is formed on another semiconductor chip, and may be mounted on the substrate on which the band pass filter BPF11 is formed, though the disclosure is not limited to this configuration. The switch group S1 may be formed on the semiconductor chip on which the low-noise amplifier LNA11 is formed. The control IC 3 may be mounted on the substrate on which the band pass filter BPF11 is formed, though the disclosure is not limited to this configuration.

The band pass filter BPF21 is constituted by one or multiple inductors and one or multiple capacitors by way of example. However, the disclosure is not restricted to this configuration. The band pass filter BPF21 may be formed on another substrate, though the disclosure is not limited to this configuration. The band pass filter BPF21 may be a SAW filter, a BAW filter, a dielectric filter, or a distributed-element filter. The low-noise amplifier LNA21 is formed on a single semiconductor chip, and may be mounted on the substrate on which the band pass filter BPF21 is formed, though the disclosure is not limited to this configuration. The switch group S3 is formed on another semiconductor chip, and may be mounted on the substrate on which the band pass filter BPF21 is formed, though the disclosure is not limited to this configuration. The switch group S3 may be formed on the semiconductor chip on which the low-noise amplifier LNA21 is formed. The switch group S4 is formed on another semiconductor chip, and may be mounted on the substrate on which the band pass filter BPF21 is formed, though the disclosure is not limited to this configuration. The switch group S4 may be formed on the semiconductor chip on which the low-noise amplifier LNA21 is formed. The control IC 4 may be mounted on the substrate on which the band pass filter BPF21 is formed, though the disclosure is not limited to this configuration.

FIG. 4 illustrates a table 20 for explaining the operation of the radio-frequency signal sending/receiving device 1 according to the first embodiment. More specifically, the table 20 shows the components within the modules M1 and M2 through which a radio-frequency signal is transmitted in each of (T) sending operation and receiving operation (R).

(T) Sending operation includes the cases of:
(T-1-1) sending by the antenna ANT1 (regular);
(T-1-2) sending by the antenna ANT1 (SRS); and
(T-2) sending by the antenna ANT2 (SRS).
(R) Receiving operation includes the cases of:
(R-1) receiving by the antenna ANT1 (regular); and
(R-2) receiving by the antenna ANT2 (regular).

The case of (T-1-1) sending by the antenna ANT1 (regular) will be discussed below. A second row 22 of the table 20 shows the components within the module M1 through which a radio-frequency sending signal TX is transmitted to be sent by the antenna ANT1 (regular).

When sending the radio-frequency sending signal TX by the antenna ANT1 (regular), the switches S1-1, S1-3, and S1-4 are OFF and the switch S1-2 is ON in accordance with the control signal Sig1.

The radio-frequency sending signal TX is input into the terminal T11 on the left side of the module M1. The power amplifier PA11 amplifies the radio-frequency sending signal TX and outputs it to one end of the switch S1-2. After passing through the switch S1-2, the radio-frequency sending signal TX is input into one end of the band pass filter BPF11. The band pass filter BPF11 allows the radio-frequency sending signal TX to pass therethrough. The radio-frequency sending signal TX is then output to the antenna ANT1 via the terminal A11 on the right side of the module M1.

The case of (T-1-2) sending by the antenna ANT1 (SRS) is similar to the case of (T-1-1) sending by the antenna ANT1 (regular), and a detailed explanation thereof will be omitted. A third row 23 of the table 20 shows the components within the module M1 through which an SRS sending signal $SRS_T$ is transmitted to be sent by the antenna ANT1 (SRS).

The case of (T-2) sending by the antenna ANT2 (SRS) will be discussed below. A fifth row 25 of the table 20 shows the components within the modules M1 and M2 through which an SRS sending signal $SRS_T$ is transmitted to be sent by the antenna ANT2 (SRS).

When sending the SRS sending signal $SRS_T$ by the antenna ANT2 (SRS), in the module M1, the switches S1-1, S1-2, and S1-4 are OFF and the switch S1-3 is ON in accordance with the control signal Sig1. In the module M2, the switch S3-1 is ON and the switch S3-2 is OFF in accordance with the control signal Sig3, while the switch S4-1 is ON and the switch S4-2 is OFF in accordance with the control signal Sig4.

The SRS sending signal $SRS_T$ is input into the terminal T11 on the left side of the module M1. The power amplifier PA11 amplifies the SRS sending signal $SRS_T$ and outputs it to one end of the switch S1-3. After passing through the switch S1-3, the SRS sending signal $SRS_T$ is input into one end of the switch S3-1 in the module M2 via the terminal E11 on the right side of the module M1 and the terminal R21 on the left side of the module M2. After passing through the switch S3-1, the SRS sending signal $SRS_T$ is input into one end of the switch S4-1. After passing through the switch S4-1, the SRS sending signal $SRS_T$ is input into one end of the band pass filter BPF21. The band pass filter BPF21 allows the SRS sending signal $SRS_T$ to pass therethrough. The SRS sending signal $SRS_T$ is then output to the antenna ANT2 via the terminal A21 on the right side of the module M2.

An arrow 11 in FIG. 3 indicates the transmission path through which the SRS sending signal $SRS_T$ is transmitted. As indicated by the arrow 11, the SRS sending signal $SRS_T$ is transmitted in order of terminal T11→power amplifier PA11→switch S1-3→terminal E11→terminal R21→switch S3-1→switch S4-1→band pass filter BPF21→terminal A21→antenna ANT2.

The case of (R-1) receiving by the antenna ANT1 (regular) will be discussed below. A first row 21 of the table 20 shows the components within the module M1 through which a radio-frequency received signal $RX_1$ received by the antenna ANT1 (regular) is transmitted.

When the radio-frequency received signal $RX_1$ is received by the antenna ANT1 (regular), the switch S1-1 is ON and the switches S1-2, S1-3, and S1-4 are OFF in accordance with the control signal Sig1.

The radio-frequency received signal $RX_1$ is input from the antenna ANT1 into the other end of the band pass filter BPF11 via the terminal A11 on the right side of the module M1. The band pass filter BPF11 allows the radio-frequency received signal $RX_1$ to pass therethrough. The radio-frequency received signal $RX_1$ is then input into the other end of the switch S1-1. After passing through the switch S1-1, the radio-frequency received signal $RX_1$ is input into the low-noise amplifier LNA11. The low-noise amplifier LNA11 amplifies the radio-frequency received signal $RX_1$ and outputs it via the terminal R11 on the left side of the module M1.

The case of (R-2) receiving by the antenna ANT2 (regular) will be discussed below. A fourth row 24 of the table 20 shows the components within the modules M1 and M2 through which a radio-frequency received signal $RX_2$ received by the antenna ANT2 (regular) is transmitted.

When the radio-frequency received signal $RX_2$ is received by the antenna ANT2 (regular), in the module M1, the switches S1-1, S1-2, and S1-3 are OFF and the switch S1-4 is ON in accordance with the control signal Sig1. In the module M2, the switch S3-1 is OFF and the switch S3-2 is ON in accordance with the control signal Sig3, while the switch S4-1 is OFF and the switch S4-2 is ON in accordance with the control signal Sig4.

The radio-frequency received signal $RX_2$ is input from the antenna ANT2 into the other end of the band pass filter BPF21 via the terminal A21 on the right side of the module M2. The band pass filter BPF21 allows the radio-frequency received signal $RX_2$ to pass therethrough. The radio-frequency received signal $RX_2$ is then input into the other end of the switch S4-2. After passing through the switch S4-2, the radio-frequency received signal $RX_2$ is input into the input terminal of the low-noise amplifier LNA21. The low-noise amplifier LNA21 amplifies the radio-frequency received signal $RX_2$ and outputs it to the other end of the switch S3-2. After passing through the switch S3-2, the radio-frequency received signal $RX_2$ is input into the other end of the switch S1-4 in the module M1 via the terminal R21 on the left side of the module M2 and the terminal E11 on the right side of the module M1. After passing through the switch S1-4, the radio-frequency received signal $RX_2$ is output via the terminal E12 on the left side of the module M1.

An arrow 12 in FIG. 3 indicates the transmission path through which the radio-frequency received signal $RX_2$ is transmitted. As indicated by the arrow 12, the radio-frequency received signal $RX_2$ is transmitted in order of antenna ANT2→terminal A21→band pass filter BPF21→switch S4-2→low-noise amplifier LNA21→switch S3-2→terminal R21→terminal E11→switch S1-4→terminal E12.

(Comparison Between Comparative Example and First Embodiment)

FIG. 5 illustrates a table 70 indicating comparison between the comparative example and the first embodiment. More specifically, the table 70 shows the number of switches through which each of the SRS sending signal $SRS_T$ and the radio-frequency received signal $RX_2$ passes, the name of the band pass filter through which each of the SRS sending signal $SRS_T$ and the radio-frequency received signal $RX_2$ passes, and the issue regarding whether a switch is required between the band pass filter BPF11 and the terminal A11.

A first row 71 of the table 70 indicates the number of switches through which the SRS sending signal $SRS_T$ passes in the case of (T-2) sending by the antenna ANT2 (SRS) and that through which the radio-frequency received signal $RX_2$ passes in the case of (R-2) receiving by the antenna ANT2 (regular).

As indicated by the arrow 111 in FIG. 1, in the case of (T-2) sending by the antenna ANT2 (SRS) in the radio-frequency signal sending/receiving device 100 of the comparative example, the SRS sending signal $SRS_T$ passes through a total of four switches, that is, the switches S1-2, S2-2, S3-1, and S4-1.

As indicated by the arrow 112 in FIG. 1, in the case of (R-2) receiving by the antenna ANT2 (regular) in the radio-frequency signal sending/receiving device 100 of the comparative example, the radio-frequency received signal $RX_2$ passes through a total of three switches, that is, the switches S4-2, S3-2, and S2-3.

In this manner, in the radio-frequency signal sending/receiving device 100, the number of switches through which the SRS sending signal $SRS_T$ passes and that through which the radio-frequency received signal $RX_2$ passes are different from each other. That is, in the comparative example, there is a significant difference in the path loss (electrical characteristics) caused by the insertion of switches between the transmission path through which the SRS sending signal $SRS_T$ passes and that through which the radio-frequency received signal $RX_2$ passes.

In contrast, as indicated by the arrow 11 in FIG. 3, in the case of (T-2) sending by the antenna ANT2 (SRS) in the radio-frequency signal sending/receiving device 1 of the first embodiment, the SRS sending signal $SRS_T$ passes through a total of three switches, that is, the switches S1-3, S3-1, and S4-1.

As indicated by the arrow 12 in FIG. 3, in the case of (R-2) receiving by the antenna ANT2 (regular) in the radio-frequency signal sending/receiving device 1 of the first embodiment, the radio-frequency received signal $RX_2$ passes through a total of three switches, that is, the switches S4-2, S3-2, and S1-4.

In this manner, in the radio-frequency signal sending/receiving device 1, the number of switches through which the SRS sending signal $SRS_T$ passes and that through which the radio-frequency received signal $RX_2$ passes are the same. That is, in the first embodiment, there is only a small difference in the path loss (electrical characteristics) caused by the insertion of switches between the transmission path through which the SRS sending signal $SRS_T$ passes and that through which the radio-frequency received signal $RX_2$ passes.

A second row 72 of the table 70 indicates the band pass filter through which the SRS sending signal $SRS_T$ passes in the case of (T-2) sending by the antenna ANT2 (SRS) and that through which the radio-frequency received signal $RX_2$ passes in the case of (R-2) receiving by the antenna ANT2 (regular).

As indicated by the arrow 111 in FIG. 1, in the case of (T-2) sending by the antenna ANT2 (SRS) in the radio-frequency signal sending/receiving device 100 of the comparative example, the SRS sending signal $SRS_T$ passes through the band pass filter BPF11.

As indicated by the arrow 112 in FIG. 1, in the case of (R-2) receiving by the antenna ANT2 (regular) in the radio-frequency signal sending/receiving device 100 of the comparative example, the radio-frequency received signal $RX_2$ passes through the band pass filter BPF21.

In this manner, in the radio-frequency signal sending/receiving device 100, the SRS sending signal $SRS_T$ and the radio-frequency received signal $RX_2$ pass through different filters, that is, the band pass filter BPF11 and the band pass filter BPF21. There may be some characteristic differences between the band pass filter BPF11 and the band pass filter BPF21. That is, in the comparative example, the path loss caused by the band pass filter in the transmission path through which the SRS sending signal $SRS_T$ passes and that through which the radio-frequency received signal $RX_2$ passes are significantly different.

In contrast, as indicated by the arrow 11 in FIG. 3, in the case of (T-2) sending by the antenna ANT2 (SRS) in the radio-frequency signal sending/receiving device 1 of the first embodiment, the SRS sending signal $SRS_T$ passes through the band pass filter BPF21.

As indicated by the arrow 12 in FIG. 3, in the case of (R-2) receiving by the antenna ANT2 (regular) in the radio-frequency signal sending/receiving device 1 of the first embodiment, the radio-frequency received signal $RX_2$ passes through the band pass filter BPF21.

In this manner, in the radio-frequency signal sending/receiving device 1, the SRS sending signal $SRS_T$ and the radio-frequency received signal $RX_2$ pass through the same band pass filter BPF21. That is, in the first embodiment, the path loss in the transmission path through which the SRS sending signal $SRS_T$ passes and that in the transmission path through which the radio-frequency received signal $RX_2$ passes are substantially the same.

As described above, in the case of communication by using the antenna ANT2, the difference in the path loss between the transmission path through which the SRS sending signal $SRS_T$ passes and that through which the radio-frequency received signal $RX_2$ passes in the radio-frequency signal sending/receiving device 1 of the first embodiment is smaller than that in the radio-frequency signal sending/receiving device 100 of the comparative example. This enables the radio-frequency signal sending/receiving device 1 to conduct higher-precision SRS by using the antenna ANT2 than the radio-frequency signal sending/receiving device 100. The radio-frequency signal sending/receiving device 1 is thus able to improve the communication quality of a mobile communication apparatus.

A third row 73 of the table 70 indicates the issue regarding whether a switch is required between the band pass filter BPF11 and the terminal A11 in each case of (T-1-2) sending by the antenna ANT1 (SRS) and (R-1) receiving by the antenna ANT1 (regular).

As shown in FIG. 1, in the radio-frequency signal sending/receiving device 100 of the comparative example, in each case of (T-1-2) sending by the antenna ANT1 (SRS) and (R-1) receiving by the antenna ANT1 (regular), the switch S2-1 is necessary between the band pass filter BPF11 and the antenna ANT1.

In contrast, as shown in FIG. 3, in the radio-frequency signal sending/receiving device 1 of the first embodiment, in each case of (T-1-2) sending by the antenna ANT1 (SRS) and (R-1) receiving by the antenna ANT1 (regular), the switch S2-1 is not necessary between the band pass filter BPF11 and the antenna ANT1.

Hence, the radio-frequency signal sending/receiving device 1 of the first embodiment is able to reduce the path loss between the band pass filter BPF11 and the terminal A11. This leads to reducing of power consumption in a mobile communication apparatus when sending a signal and also to improving of the communication quality. Additionally, the provision of the switch group S102 is omitted. This means that fewer components are required in the radio-frequency signal sending/receiving device 1. The size of a substrate on which the radio-frequency signal sending/receiving device 1 is mounted is also decreased and the cost is accordingly reduced.

Second Embodiment

Figure 6:
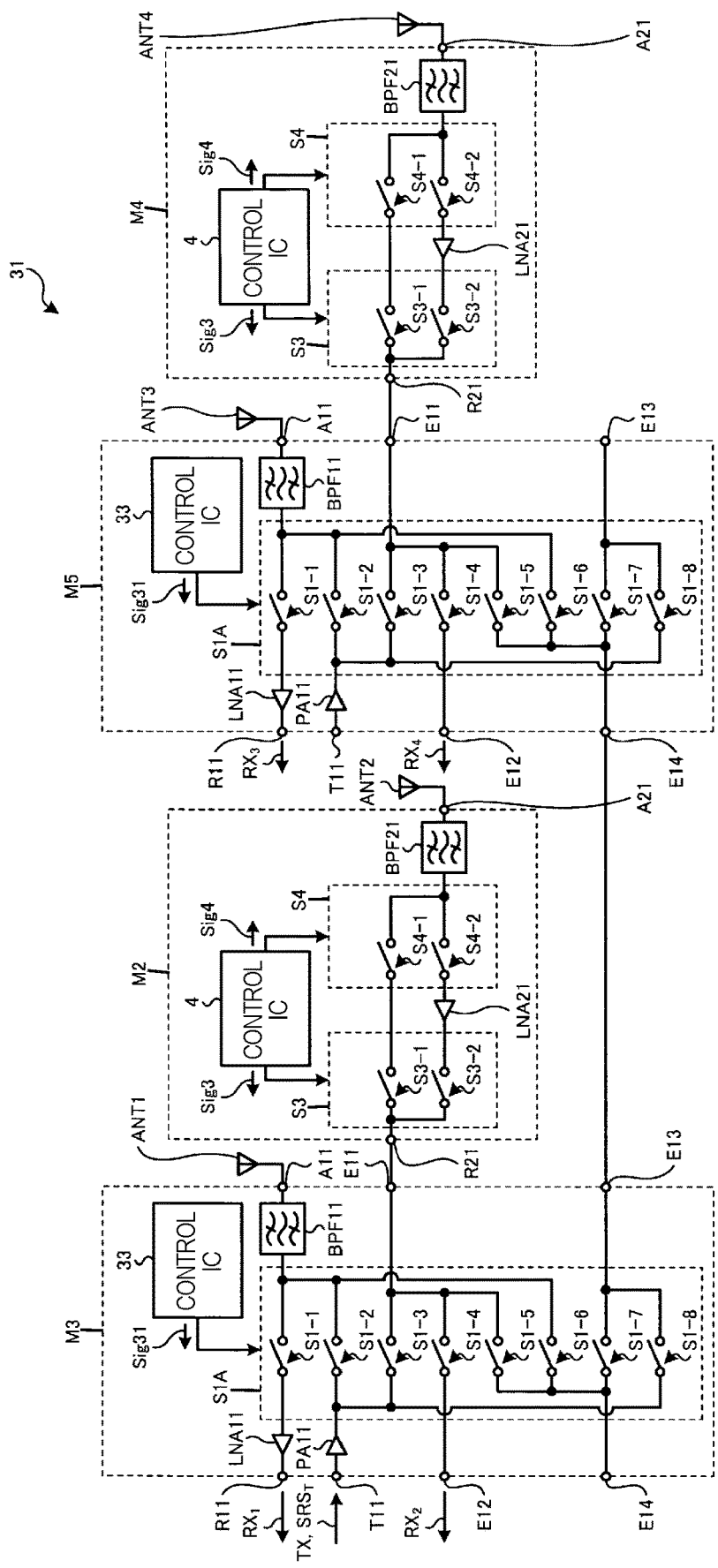
FIG. 6 is a circuit diagram illustrating a radio-frequency signal sending/receiving device according to a second embodiment.

FIG. 6 is a circuit diagram illustrating a radio-frequency signal sending/receiving device 31 according to a second embodiment. The radio-frequency signal sending/receiving device 31 includes modules M2, M3, M4, and M5.

Elements of the radio-frequency signal sending/receiving device 31 identical to those of the first embodiment or the comparative example are designated by like reference numerals, and an explanation thereof will be omitted.

The module M3 is electrically connected to the antenna ANT1. The module M2 is electrically connected to the antenna ANT2. The module M5 is electrically connected to the antenna ANT3. The module M4 is electrically connected to the antenna ANT4.

The antenna ANT3 corresponds to a third antenna of an embodiment of the disclosure, while the antenna ANT4 corresponds to a fourth antenna of an embodiment of the disclosure.

Each of the modules M3, M4, and M5 corresponds to a radio-frequency signal sending/receiving circuit of an embodiment of the disclosure.

In regular communication, the radio-frequency signal sending/receiving device 31 sends radio waves by using the antenna ANT1 and receives radio waves by using the antennas ANT1 through ANT4. That is, the radio-frequency signal sending/receiving device 31 supports 1T4R.

In SRS communication, the radio-frequency signal sending/receiving device 31 sends radio waves by using each of the antennas ANT1 through ANT4.

The module M3 includes terminals E13 and E14 in addition to the terminals included in the module M1 (see FIG. 3).

In the module M3, the terminal E14 corresponds to a sixth terminal of an embodiment of the disclosure, and the terminal E13 corresponds to a seventh terminal of an embodiment of the disclosure.

The module M3 includes a switch group S1A instead of the switch group S1 of the module M1 (see FIG. 3). The switch group S1A includes switches S1-5 through S1-8 in addition to the switches S1-1 through S1-4 included in the switch group S1.

One end of the switch S1-5 is electrically connected to the terminal E14, and the other end thereof is electrically connected to the terminal E11.

One end of the switch S1-6 is electrically connected to the terminal E14, and the other end thereof is electrically connected to one end of the band pass filter BPF11.

One end of the switch S1-7 is electrically connected to the terminal E14, and the other end thereof is electrically connected to the terminal E13.

One end of the switch S1-8 is electrically connected to the output terminal of the power amplifier PA11, and the other end thereof is electrically connected to the terminal E13.

In the module M3, the switch S1-5 corresponds to a fifth switch of an embodiment of the disclosure, the switch S1-6 corresponds to a sixth switch of an embodiment of the disclosure, and the switch S1-8 corresponds to a seventh switch of an embodiment of the disclosure.

The switches S1-1 through S1-8 of the switch group S1A are individually turned ON or OFF in accordance with a control signal Sig31 output from a control IC 33.

The circuit configuration of the module M5 is the same as that of the module M3. The terminal E14 of the module M5 is electrically connected to the terminal E13 of the module M3. The terminal A11 of the module M5 is electrically connected to the antenna ANT3.

The circuit configuration of the module M4 is the same as that of the module M2. The terminal R21 of the module M4 is electrically connected to the terminal E11 of the module M5. The terminal A21 of the module M4 is electrically connected to the antenna ANT4.

FIG. 7 illustrates a table 40 for explaining the operation of the radio-frequency signal sending/receiving device 31 according to the second embodiment. More specifically, the table 40 shows the components within the modules M2 through M5 through which a radio-frequency signal is transmitted in each of (T) sending operation and receiving operation (R).

(T) Sending operation includes the cases of:
(T-1-1) sending by the antenna ANT1 (regular);
(T-1-2) sending by the antenna ANT1 (SRS);
(T-2) sending by the antenna ANT2 (SRS);
(T-3) sending by the antenna ANT3 (SRS); and
(T-4) sending by the antenna ANT4 (SRS).
(R) Receiving operation includes the cases of:
(R-1) receiving by the antenna ANT1 (regular);
(R-2) receiving by the antenna ANT2 (regular);
(R-3) receiving by the antenna ANT3 (regular); and
(R-4) receiving by the antenna ANT4 (regular).

The case of (T-1-1) sending by the antenna ANT1 (regular) will be discussed below. A second row 42 of the table 40 shows the components within the module M3 through which a radio-frequency sending signal TX is transmitted to be sent by the antenna ANT1 (regular).

When sending the radio-frequency sending signal TX by the antenna ANT1 (regular), the switches S1-1 and S1-3 through S1-8 are OFF and the switch S1-2 is ON in accordance with the control signal Sig31.

The radio-frequency sending signal TX is input into the terminal T11 on the left side of the module M3. The power amplifier PA11 amplifies the radio-frequency sending signal TX and outputs it to one end of the switch S1-2. After passing through the switch S1-2, the radio-frequency sending signal TX is input into one end of the band pass filter BPF11. The band pass filter BPF11 allows the radio-frequency sending signal TX to pass therethrough. The radio-frequency sending signal TX is then output to the antenna ANT1 via the terminal A11 on the right side of the module M3.

The case of (T-1-2) sending by the antenna ANT1 (SRS) is similar to the case of (T-1-1) sending by the antenna ANT1 (regular), and a detailed explanation thereof will be omitted. A third row 43 of the table 40 shows the components within the module M3 through which an SRS sending signal $SRS_T$ is transmitted to be sent by the antenna ANT1 (SRS).

The case of (T-2) sending by the antenna ANT2 (SRS) will be discussed below. A fifth row 45 of the table 40 shows the components within the modules M2 and M3 through which an SRS sending signal $SRS_T$ is transmitted to be sent by the antenna ANT2 (SRS).

When sending the SRS sending signal $SRS_T$ by the antenna ANT2 (SRS), in the module M3, the switches S1-1, S1-2, and S1-4 through S1-8 are OFF and the switch S1-3 is ON in accordance with the control signal Sig31. In the module M2, the switch S3-1 is ON and the switch S3-2 is OFF in accordance with the control signal Sig3, while the switch S4-1 is ON and the switch S4-2 is OFF in accordance with the control signal Sig4.

An SRS sending signal $SRS_T$ is input into the terminal T11 on the left side of the module M3. The power amplifier PA11 amplifies the SRS sending signal $SRS_T$ and outputs it to one end of the switch S1-3. After passing through the switch S1-3, the SRS sending signal $SRS_T$ is input into one end of the switch S3-1 in the module M2 via the terminal E11 on the right side of the module M3 and the terminal R21 on the left side of the module M2. After passing through the switch S3-1, the SRS sending signal $SRS_T$ is input into one end of the switch S4-1. After passing through the switch S4-1, the SRS sending signal $SRS_T$ is input into one end of the band pass filter BPF21. The band pass filter BPF21 allows the SRS sending signal $SRS_T$ to pass therethrough. The SRS sending signal $SRS_T$ is then output to the antenna ANT2 via the terminal A21 on the right side of the module M2.

The case of (T-3) sending by the antenna ANT3 (SRS) will be discussed below. A seventh row 47 of the table 40 shows the components within the modules M3 and M5 through which an SRS sending signal $SRS_T$ is transmitted to be sent by the antenna ANT3 (SRS).

When sending the SRS sending signal $SRS_T$ by the antenna ANT3 (SRS), in the module M3, the switches S1-1 through S1-7 are OFF and the switch S1-8 is ON in accordance with the control signal Sig31. In the module M5, the switches S1-1 through S1-5, S1-7, and S1-8 are OFF and the switch S1-6 is ON in accordance with the control signal Sig31.

An SRS sending signal $SRS_T$ is input into the terminal T11 on the left side of the module M3. The power amplifier PA11 amplifies the SRS sending signal $SRS_T$ and outputs it to one end of the switch S1-8. After passing through the switch S1-8, the SRS sending signal $SRS_T$ is input into one end of the switch S1-6 in the module M5 via the terminal E13 on the right side of the module M3 and the terminal E14 on the left side of the module M5. After passing through the switch S1-6, the SRS sending signal $SRS_T$ is input into one end of the band pass filter BPF11. The band pass filter BPF11 allows the SRS sending signal $SRS_T$ to pass therethrough. The SRS sending signal $SRS_T$ is then output to the antenna ANT3 via the terminal A11 on the right side of the module M5.

The case of (T-4) sending by the antenna ANT4 (SRS) will be discussed below. A ninth row 49 of the table 40 shows the components within the modules M3, M4, and M5 through which an SRS sending signal $SRS_T$ is transmitted to be sent by the antenna ANT4 (SRS).

When sending the SRS sending signal $SRS_T$ by the antenna ANT4 (SRS), in the module M3, the switches S1-1 through S1-7 are OFF and the switch S1-8 is ON in accordance with the control signal Sig31. In the module M5, the switches S1-1 through S1-4 and S1-6 through S1-8 are OFF and the switch S1-5 is ON in accordance with the control signal Sig31. In the module M4, the switch S3-1 is ON and the switch S3-2 is OFF in accordance with the control signal Sig3, while the switch S4-1 is ON and the switch S4-2 is OFF in accordance with the control signal Sig4.

An SRS sending signal $SRS_T$ is input into the terminal T11 on the left side of the module M3. The power amplifier PA11 amplifies the SRS sending signal $SRS_T$ and outputs it to one end of the switch S1-8. After passing through the switch S1-8, the SRS sending signal $SRS_T$ is input into one end of the switch S1-5 in the module M5 via the terminal E13 on the right side of the module M3 and the terminal E14 on the left side of the module M5. After passing through the switch S1-5, the SRS sending signal $SRS_T$ is input into one end of the switch S3-1 in the module M4 via the terminal E11 on the right side of the module M5 and the terminal R21 on the left side of the module M4. After passing through the switch S3-1, the SRS sending signal $SRS_T$ is input into one end of the switch S4-1. After passing through the switch S4-1, the SRS sending signal $SRS_T$ is input into one end of the band pass filter BPF21. The band pass filter BPF21 allows the SRS sending signal $SRS_T$ to pass therethrough. The SRS sending signal $SRS_T$ is then output to the antenna ANT4 via the terminal A21 on the right side of the module M4.

The case of (R-1) receiving by the antenna ANT1 (regular) will be discussed below. A first row 41 of the table 40 shows the components within the module M3 through which a radio-frequency received signal $RX_1$ received by the antenna ANT1 (regular) is transmitted.

When the radio-frequency received signal $RX_1$ is received by the antenna ANT1 (regular), in the module M3, the switch S1-1 is ON and the switches S1-2 through S1-8 are OFF in accordance with the control signal Sig31.

The radio-frequency received signal $RX_1$ is input from the antenna ANT1 into the other end of the band pass filter BPF11 via the terminal A11 on the right side of the module M3. The band pass filter BPF11 allows the radio-frequency received signal $RX_1$ to pass therethrough. The radio-frequency received signal $RX_1$ is then input into the other end of the switch S1-1. After passing through the switch S1-1, the radio-frequency received signal $RX_1$ is input into the low-noise amplifier LNA11. The low-noise amplifier LNA11 amplifies the radio-frequency received signal $RX_1$ and outputs it via the terminal R11 on the left side of the module M3.

The case of (R-2) receiving by the antenna ANT2 (regular) will be discussed below. A fourth row 44 of the table 40 shows the components within the modules M2 and M3 through which a radio-frequency received signal $RX_2$ received by the antenna ANT2 (regular) is transmitted.

When the radio-frequency received signal $RX_2$ is received by the antenna ANT2 (regular), in the module M3, the switches S1-1 through S1-3 and S1-5 through S1-8 are OFF and the switch S1-4 is ON in accordance with the control signal Sig31. In the module M2, the switch S3-1 is OFF and the switch S3-2 is ON in accordance with the control signal Sig3, while the switch S4-1 is OFF and the switch S4-2 is ON in accordance with the control signal Sig4.

The radio-frequency received signal $RX_2$ is input from the antenna ANT2 into the other end of the band pass filter BPF21 via the terminal A21 on the right side of the module M2. The band pass filter BPF21 allows the radio-frequency received signal $RX_2$ to pass therethrough. The radio-frequency received signal $RX_2$ is then input into the other end of the switch S4-2. After passing through the switch S4-2, the radio-frequency received signal $RX_2$ is input into the input terminal of the low-noise amplifier LNA21. The low-noise amplifier LNA21 amplifies the radio-frequency received signal $RX_2$ and outputs it to the other end of the switch S3-2. After passing through the switch S3-2, the radio-frequency received signal $RX_2$ is input into the other end of the switch S1-4 in the module M3 via the terminal R21 on the left side of the module M2 and the terminal E11 on the right side of the module M3. After passing through the switch S1-4, the radio-frequency received signal $RX_2$ is output via the terminal E12 on the left side of the module M3.

The case of (R-3) receiving by the antenna ANT3 (regular) will be discussed below. A sixth row 46 of the table 40 shows the components within the module M5 through which a radio-frequency received signal $RX_3$ received by the antenna ANT3 (regular) is transmitted.

When the radio-frequency received signal $RX_3$ is received by the antenna ANT3 (regular), in the module M5, the switch S1-1 is ON and the switches S1-2 through S1-8 are OFF in accordance with the control signal Sig31.

The radio-frequency received signal $RX_3$ is input from the antenna ANT3 into the other end of the band pass filter BPF11 via the terminal A11 on the right side of the module M5. The band pass filter BPF11 allows the radio-frequency received signal $RX_3$ to pass therethrough. The radio-frequency received signal $RX_3$ is then input into the other end of the switch S1-1. After passing through the switch S1-1, the radio-frequency received signal $RX_3$ is input into the output terminal of the low-noise amplifier LNA11. The low-noise amplifier LNA11 amplifies the radio-frequency received signal $RX_3$ and outputs it via the terminal R11 on the left side of the module M5.

The case of (R-4) receiving by the antenna ANT4 (regular) will be discussed below. An eighth row 48 of the table 40 shows the components within the modules M4 and M5 through which a radio-frequency received signal $RX_4$ received by the antenna ANT4 (regular) is transmitted.

When the radio-frequency received signal $RX_4$ is received by the antenna ANT4 (regular), in the module M5, the switches S1-1 through S1-3 and S1-5 through S1-8 are OFF and the switch S1-4 is ON in accordance with the control signal Sig31. In the module M4, the switch S3-1 is OFF and the switch S3-2 is ON in accordance with the control signal Sig3, while the switch S4-1 is OFF and the switch S4-2 is ON in accordance with the control signal Sig4.

The radio-frequency received signal $RX_4$ is input from the antenna ANT4 into the other end of the band pass filter BPF21 via the terminal A21 on the right side of the module M4. The band pass filter BPF21 allows the radio-frequency received signal $RX_4$ to pass therethrough. The radio-frequency received signal $RX_4$ is then input into the other end of the switch S4-2. After passing through the switch S4-2, the radio-frequency received signal $RX_4$ is input into the input terminal of the low-noise amplifier LNA21. The low-noise amplifier LNA21 amplifies the radio-frequency received signal $RX_4$ and outputs it to the other end of the switch S3-2. After passing through the switch S3-2, the radio-frequency received signal $RX_4$ is input into the other end of the switch S1-4 in the module M5 via the terminal R21 on the left side of the module M4 and the terminal E11 on the right side of the module M5. After passing through the switch S1-4, the radio-frequency received signal $RX_4$ is output via the terminal E12 on the left side of the module M5.

As discussed above, in the radio-frequency signal sending/receiving device 31 of the second embodiment, in the case of (T-2) sending by the antenna ANT2 (SRS), the SRS sending signal $SRS_T$ passes through a total of three switches, that is, the switch S1-3 within the module M3 and the switches S3-1 and S4-1 within the module M2. The SRS sending signal $SRS_T$ also passes through the band pass filter BPF21 within the module M2. In the case of (R-2) receiving by the antenna ANT2 (regular), the radio-frequency received signal $RX_2$ passes through a total of three switches, that is, the switches S4-2 and S3-2 within the module M2 and the switch S1-4 within the module M3. The radio-frequency received signal $RX_2$ also passes through the band pass filter BPF21 within the module M2.

In the radio-frequency signal sending/receiving device 31 of the second embodiment, in the case of (T-3) sending by the antenna ANT3 (SRS), the SRS sending signal SRS$_T$ passes through the band pass filter BPF11 within the module M5. In the case of (R-3) receiving by the antenna ANT3 (regular), the radio-frequency received signal RX$_3$ passes through the band pass filter BPF11 within the module M5.

In the radio-frequency signal sending/receiving device 31, in the case of (T-4) sending by the antenna ANT4 (SRS), the SRS sending signal SRS$_T$ passes through the band pass filter BPF21 within the module M4. In the case of (R-4) receiving by the antenna ANT4 (regular), the radio-frequency received signal RX$_4$ passes through the band pass filter BPF21 within the module M4.

With the above-described configuration, in the radio-frequency signal sending/receiving device 31, there is only a small difference in the path loss between the transmission path through which the SRS sending signal SRS$_T$ passes and that through which the radio-frequency received signal RX passes. This enables the radio-frequency signal sending/receiving device 31 to conduct high-precision SRS. The radio-frequency signal sending/receiving device 31 is thus able to improve the communication quality of a mobile communication apparatus.

The circuit configuration of the module M5 is the same as that of the module M3. The circuit configuration of the module M4 is the same as that of the module M2. This means that fewer module model types are required in the radio-frequency signal sending/receiving device 31. This facilitates module-model-type management and manufacturing management, which leads to reducing of the cost.

The module M3 (module M5) can be formed by adding the switches S1-5 through S1-8 to the module M1 (see FIG. 3). In the radio-frequency signal sending/receiving device 1, the module M1 may be replaced by the module M3. That is, the module M3 supports both of 1T2R and 2T4R. The use of the module M3 can thus reduce the number of module model types and facilitate module-model-type management and manufacturing management, which leads to reducing of the cost.

Third Embodiment

Figure 8:
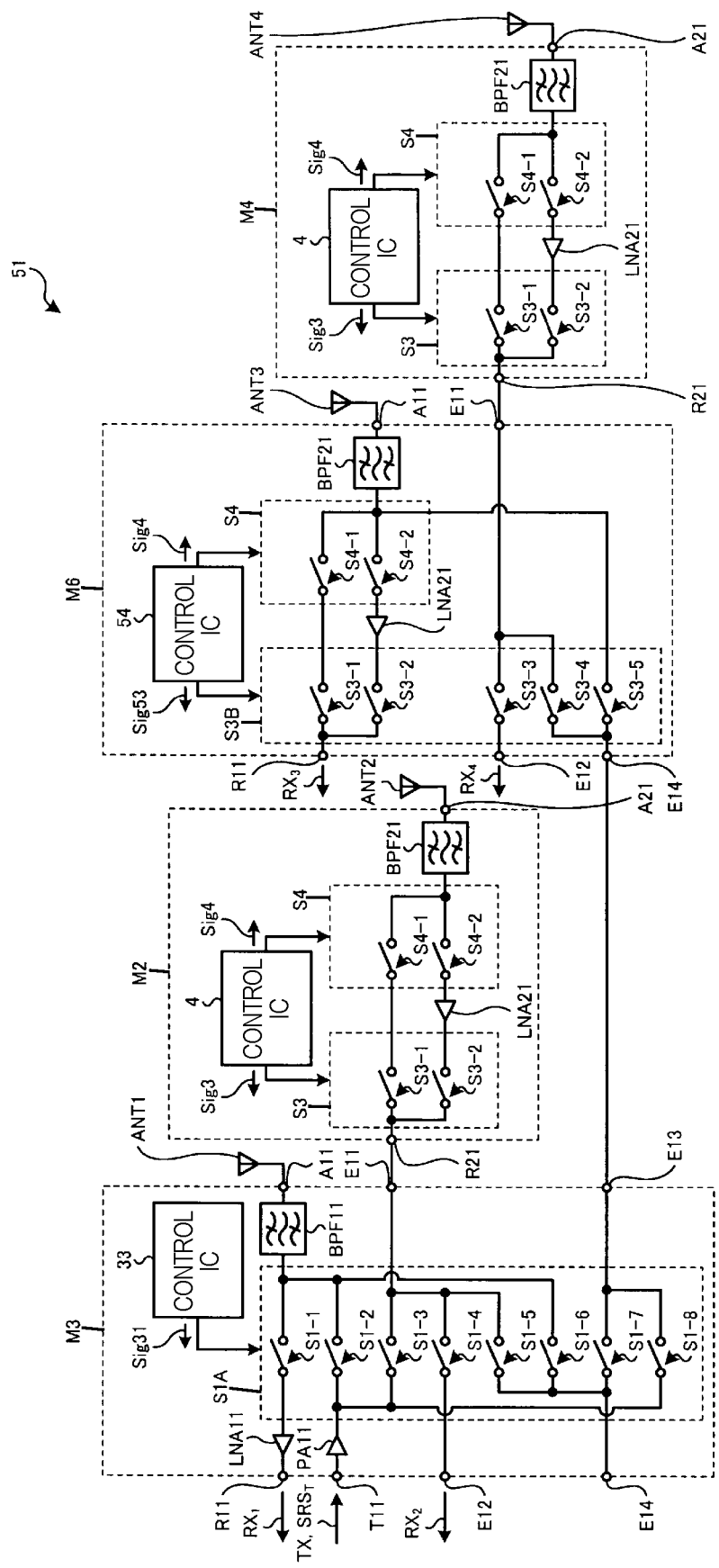
FIG. 8 is a circuit diagram illustrating a radio-frequency signal sending/receiving device according to a third embodiment.

FIG. 8 is a circuit diagram illustrating a radio-frequency signal sending/receiving device 51 according to a third embodiment. The radio-frequency signal sending/receiving device 51 includes modules M2, M3, M4, and M6.

Elements of the radio-frequency signal sending/receiving device 51 identical to those of the other embodiments or the comparative example are designated by like reference numerals, and an explanation thereof will be omitted.

The module M6 is electrically connected to the antenna ANT3.

The module M6 corresponds to a radio-frequency signal sending/receiving circuit of an embodiment of the disclosure.

In regular communication, the radio-frequency signal sending/receiving device 51 sends radio waves by using the antenna ANT1 and receives radio waves by using the antennas ANT1 through ANT4. That is, the radio-frequency signal sending/receiving device 51 supports 1T4R.

In SRS communication, the radio-frequency signal sending/receiving device 51 sends radio waves by using each of the antennas ANT1 through ANT4.

The module M6 includes a switch group S3B instead of the switch group S3 of the module M2. The switch group S3B includes switches S3-3 through S3-5 in addition to the switches S3-1 and S3-2 included in the switch group S3.

One end of the switch S3-3 is electrically connected to the terminal E12, and the other end thereof is electrically connected to the terminal E11.

One end of the switch S3-4 is electrically connected to the terminal E14, and the other end thereof is electrically connected to the terminal E11.

One end of the switch S3-5 is electrically connected to the terminal E14, and the other end thereof is electrically connected to one end of the band pass filter BPF21.

In the module M6, the terminal E12 corresponds to a third terminal of an embodiment of the disclosure, the terminal E14 corresponds to a fourth terminal of an embodiment of the disclosure, and the terminal E11 corresponds to a fifth terminal of an embodiment of the disclosure. In the module M6, the switches S3-3 through S3-5 respectively correspond to fifth through seventh switches of an embodiment of the disclosure.

The switches S3-1 through S3-5 of the switch group S3B are individually turned ON or OFF in accordance with a control signal Sig53 output from a control IC 54.

FIG. 9 illustrates a table 60 for explaining the operation of the radio-frequency signal sending/receiving device 51 according to the third embodiment. More specifically, the table 60 shows the components within the modules M2, M3, M4, and M6 through which a radio-frequency signal is transmitted in each of (T) sending operation and receiving operation (R).

(T) Sending operation includes the cases of:
(T-1-1) sending by the antenna ANT1 (regular);
(T-1-2) sending by the antenna ANT1 (SRS);
(T-2) sending by the antenna ANT2 (SRS);
(T-3) sending by the antenna ANT3 (SRS); and
(T-4) sending by the antenna ANT4 (SRS).
(R) Receiving operation includes the cases of:
(R-1) receiving by the antenna ANT1 (regular);
(R-2) receiving by the antenna ANT2 (regular);
(R-3) receiving by the antenna ANT3 (regular); and
(R-4) receiving by the antenna ANT4 (regular).

The case of (T-1-1) sending by the antenna ANT1 (regular) is similar to that of the second embodiment, and a detailed explanation thereof will be omitted. A second row 62 of the table 60 shows the components within the module M3 through which a radio-frequency sending signal TX is transmitted to be sent by the antenna ANT1 (regular).

The case of (T-1-2) sending by the antenna ANT1 (SRS) is similar to that of the second embodiment, and a detailed explanation thereof will be omitted. A third row 63 of the table 60 shows the components within the module M3 through which an SRS sending signal SRS$_T$ is transmitted to be sent by the antenna ANT1 (SRS).

The case of (T-2) sending by the antenna ANT2 (SRS) is similar to that of the second embodiment, and a detailed explanation thereof will be omitted. A fifth row 65 of the table 60 shows the components within the modules M2 and M3 through which an SRS sending signal SRS$_T$ is transmitted to be sent by the antenna ANT2 (SRS).

The case of (T-3) sending by the antenna ANT3 (SRS) will be discussed below. A seventh row 67 of the table 60 shows the components within the modules M3 and M6 through which an SRS sending signal SRS$_T$ is transmitted to be sent by the antenna ANT3 (SRS).

When sending the SRS sending signal SRS$_T$ by the antenna ANT3 (SRS), in the module M3, the switches S1-1 through S1-7 are OFF and the switch S1-8 is ON in accordance with the control signal Sig31. In the module M6, the switches S3-1 through S3-4 are OFF and the switch S3-5 is ON in accordance with the control signal Sig53, while the switches S4-1 and S4-2 are OFF in accordance with the control signal Sig4.

An SRS sending signal $SRS_T$ is input into the terminal T11 on the left side of the module M3. The power amplifier PA11 amplifies the SRS sending signal $SRS_T$ and outputs it to one end of the switch S1-8. After passing through the switch S1-8, the SRS sending signal $SRS_T$ is input into one end of the switch S3-5 in the module M6 via the terminal E13 on the right side of the module M3 and the terminal E14 on the left side of the module M6. After passing through the switch S3-5, the SRS sending signal $SRS_T$ is input into one end of the band pass filter BPF21. The band pass filter BPF21 allows the SRS sending signal $SRS_T$ to pass therethrough. The SRS sending signal $SRS_T$ is then output to the antenna ANT3 via the terminal A11 on the right side of the module M6.

The case of (T-4) sending by the antenna ANT4 (SRS) will be discussed below. A ninth row 69 of the table 60 shows the components within the modules M3, M4, and M6 through which an SRS sending signal $SRS_T$ is transmitted to be sent by the antenna ANT4 (SRS).

When sending the SRS sending signal $SRS_T$ by the antenna ANT4 (SRS), in the module M3, the switches S1-1 through S1-7 are OFF and the switch S1-8 is ON in accordance with the control signal Sig31. In the module M6, the switches S3-1 through S3-3 and S3-5 are OFF and the switch S3-4 is ON in accordance with the control signal Sig53, while the switches S4-1 and S4-2 are OFF in accordance with the control signal Sig4. In the module M4, the switch S3-1 is ON and the switch S3-2 is OFF in accordance with the control signal Sig3, while the switch S4-1 is ON and the switch S4-2 is OFF in accordance with the control signal Sig4.

An SRS sending signal $SRS_T$ is input into the terminal T11 on the left side of the module M3. The power amplifier PA11 amplifies the SRS sending signal $SRS_T$ and outputs it to one end of the switch S1-8. After passing through the switch S1-8, the SRS sending signal $SRS_T$ is input into one end of the switch S3-4 in the module M6 via the terminal E13 on the right side of the module M3 and the terminal E14 on the left side of the module M6. After passing through the switch S3-4, the SRS sending signal $SRS_T$ is input into one end of the switch S3-1 in the module M4 via the terminal E11 on the right side of the module M6 and the terminal R21 on the left side of the module M4. After passing through the switch S3-1, the SRS sending signal $SRS_T$ is input into one end of the switch S4-1. After passing through the switch S4-1, the SRS sending signal $SRS_T$ is input into one end of the band pass filter BPF21. The band pass filter BPF21 allows the SRS sending signal $SRS_T$ to pass therethrough. The SRS sending signal $SRS_T$ is then output to the antenna ANT4 via the terminal A21 on the right side of the module M4.

The case of (R-1) receiving by the antenna ANT1 (regular) is similar to that of the second embodiment, and a detailed explanation thereof will be omitted. A first row 61 of the table 60 shows the components within the module M3 through which a radio-frequency received signal $RX_1$ received by the antenna ANT1 (regular) is transmitted.

The case of (R-2) receiving by the antenna ANT2 (regular) is similar to that of the second embodiment, and a detailed explanation thereof will be omitted. A fourth row 64 of the table 60 shows the components within the modules M2 and M3 through which a radio-frequency received signal $RX_2$ received by the antenna ANT2 (regular) is transmitted.

The case of (R-3) receiving by the antenna ANT3 (regular) will be discussed below. A sixth row 66 of the table 60 shows the components within the module M6 through which a radio-frequency received signal $RX_3$ received by the antenna ANT3 (regular) is transmitted.

When the radio-frequency received signal $RX_3$ is received by the antenna ANT3 (regular), in the module M6, the switches S3-1 and S3-3 through S3-5 are OFF and the switch S3-2 is ON in accordance with the control signal Sig53, while the switch S4-1 is OFF and the switch S4-2 is ON in accordance with the control signal Sig4.

The radio-frequency received signal $RX_3$ is input from the antenna ANT3 into the other end of the band pass filter BPF21 via the terminal A11 on the right side of the module M6. The band pass filter BPF21 allows the radio-frequency received signal $RX_3$ to pass therethrough. The radio-frequency received signal $RX_3$ is then input into the other end of the switch S4-2. After passing through the switch S4-2, the radio-frequency received signal $RX_3$ is input into the input terminal of the low-noise amplifier LNA21. The low-noise amplifier LNA21 amplifies the radio-frequency received signal $RX_3$ and outputs it to the other end of the switch S3-2. After passing through the switch S3-2, the radio-frequency received signal $RX_3$ is output via the terminal R11 on the left side of the module M6.

The case of (R-4) receiving by the antenna ANT4 (regular) will be discussed below. An eighth row 68 of the table 60 shows the components within the modules M4 and M6 through which a radio-frequency received signal $RX_4$ received by the antenna ANT4 (regular) is transmitted.

When the radio-frequency received signal $RX_4$ is received by the antenna ANT4 (regular), in the module M6, the switches S3-1, S3-2, S3-4, and S3-5 are OFF and the switch S3-3 is ON in accordance with the control signal Sig53. In the module M6, the switches S4-1 and S4-2 are OFF in accordance with the control signal Sig4. In the module M4, the switch S3-1 is OFF and the switch S3-2 is ON in accordance with the control signal Sig3, while the switch S4-1 is OFF and the switch S4-2 is ON in accordance with the control signal Sig4.

The radio-frequency received signal $RX_4$ is input from the antenna ANT4 into the other end of the band pass filter BPF21 via the terminal A21 on the right side of the module M4. The band pass filter BPF21 allows the radio-frequency received signal $RX_4$ to pass therethrough. The radio-frequency received signal $RX_4$ is then input into the other end of the switch S4-2. After passing through the switch S4-2, the radio-frequency received signal $RX_4$ is input into the input terminal of the low-noise amplifier LNA21. The low-noise amplifier LNA21 amplifies the radio-frequency received signal $RX_4$ and outputs it to the other end of the switch S3-2. After passing through the switch S3-2, the radio-frequency received signal $RX_4$ is input into the other end of the switch S3-3 in the module M6 via the terminal R21 on the left side of the module M4 and the terminal E11 on the right side of the module M6. After passing through the switch S3-3, the radio-frequency received signal $RX_4$ is output via the terminal E12 on the left side of the module M6.

As discussed above, in the radio-frequency signal sending/receiving device 51 of the third embodiment, in the case of (T-2) sending by the antenna ANT2 (SRS), the SRS sending signal $SRS_T$ passes through a total of three switches, that is, the switch S1-3 within the module M3 and the switches S3-1 and S4-1 within the module M2. The SRS sending signal $SRS_T$ also passes through the band pass filter BPF21 within the module M2. In the case of (R-2) receiving by the antenna ANT2 (regular), the radio-frequency received signal $RX_2$ passes through a total of three switches, that is, the switches S4-2 and S3-2 within the module M2 and the switch S1-4 within the module M3. The radio-frequency received signal $RX_2$ also passes through the band pass filter BPF21 within the module M2.

In the radio-frequency signal sending/receiving device 51, in the case of (T-3) sending by the antenna ANT3 (SRS), the SRS sending signal $SRS_T$ passes through the band pass filter BPF21 within the module M6. In the case of (R-3) receiving by the antenna ANT3 (regular), the radio-frequency received signal $RX_3$ passes through the band pass filter BPF21 within the module M6.

In the radio-frequency signal sending/receiving device 51, in the case of (T-4) sending by the antenna ANT4 (SRS), the SRS sending signal $SRS_T$ passes through the band pass filter BPF21 within the module M4. In the case of (R-4) receiving by the antenna ANT4 (regular), the radio-frequency received signal $RX_4$ passes through the band pass filter BPF21 within the module M4.

With the above-described configuration, in the radio-frequency signal sending/receiving device 51, there is only a small difference in the path loss between the transmission path through which the SRS sending signal $SRS_T$ passes and that through which the radio-frequency received signal RX passes. This enables the radio-frequency signal sending/receiving device 51 to conduct high-precision SRS. The radio-frequency signal sending/receiving device 51 is thus able to improve the communication quality of a mobile communication apparatus.

Unlike the module M5 (see FIG. 6), the power amplifier PA11 is omitted in the module M6. The switch group S3B in the module M6 has five switches, while the switch group S1A in the module M5 has eighth switches. Fewer components are thus disposed in the module M6 than those in the module M5. This decreases the size of the module M6 and also reduces the cost.

Fourth Embodiment

Figure 10:
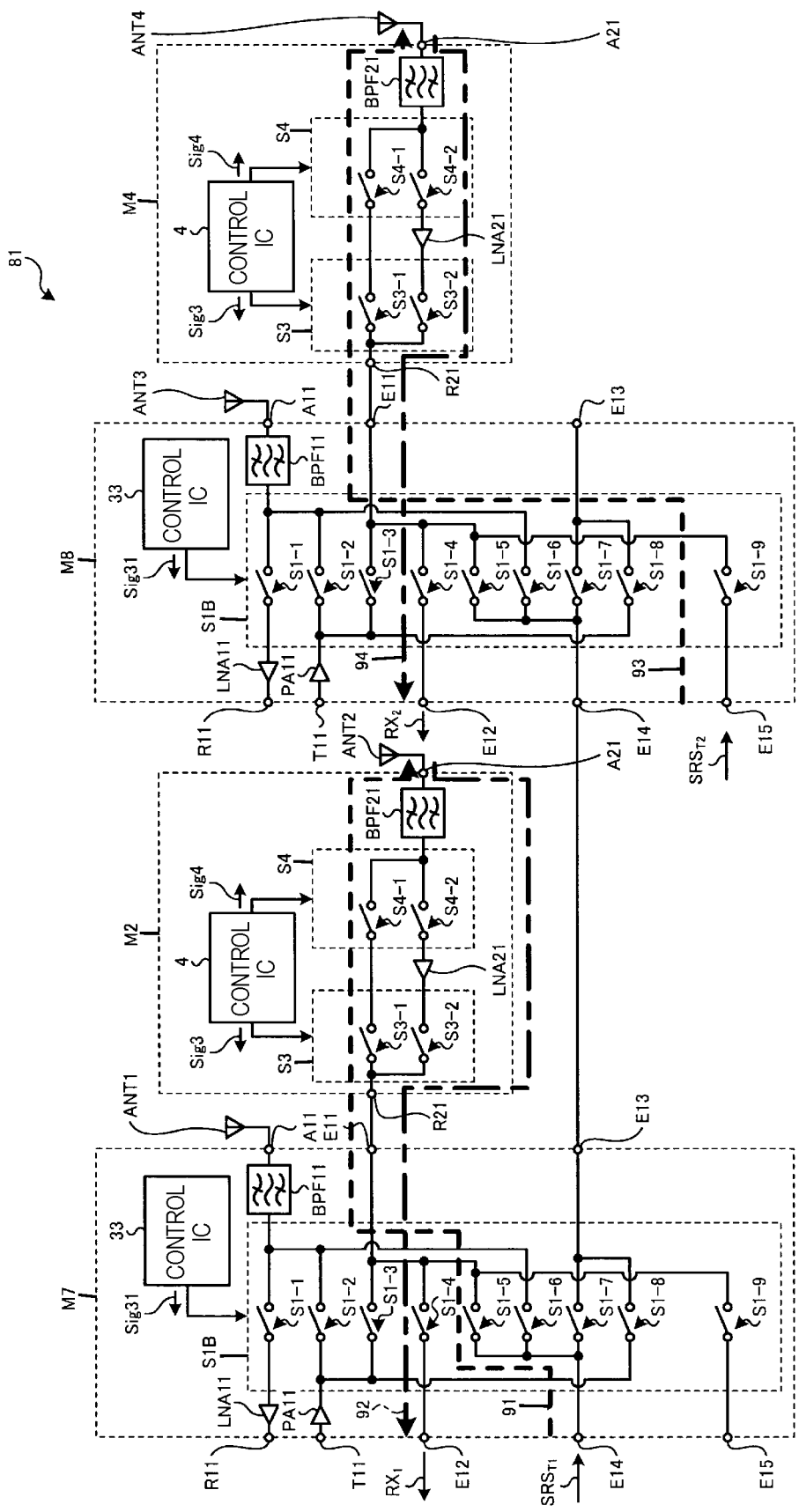
FIG. 10 is a circuit diagram illustrating a radio-frequency signal sending/receiving device according to a fourth embodiment.

FIG. 10 is a circuit diagram illustrating a radio-frequency signal sending/receiving device 81 according to a fourth embodiment. The radio-frequency signal sending/receiving device 81 includes modules M2, M4, M7, and M8.

Elements of the radio-frequency signal sending/receiving device 81 identical to those of the other embodiments or the comparative example are designated by like reference numerals, and an explanation thereof will be omitted.

The module M7 is electrically connected to the antenna ANT1. The module M2 is electrically connected to the antenna ANT2. The module M8 is electrically connected to the antenna ANT3. The module M4 is electrically connected to the antenna ANT4.

Each of the modules M7 and M8 corresponds to a radio-frequency signal sending/receiving circuit of an embodiment of the disclosure.

The radio-frequency signal sending/receiving device 81 uses an external power amplifier to amplify SRS sending signals $SRS_{T1}$ and $SRS_{T2}$ without necessarily using the power amplifier PA11 and sends the signals $SRS_{T1}$ and $SRS_{T2}$.

In SRS communication, the radio-frequency signal sending/receiving device 81 sends radio waves by using each of the antennas ANT2 and ANT4.

In regular communication, the radio-frequency signal sending/receiving device 81 receives radio waves by using the antennas ANT2 and ANT4.

The module M7 includes a terminal E15 in addition to the terminals included in the module M3 (see FIG. 6).

The terminal E15 in the module M7 corresponds to an eighth terminal of an embodiment of the disclosure.

The module M7 includes a switch group S1B instead of the switch group S1A of the module M3 (see FIG. 6). The switch group S1B includes a switch S1-9 in addition to the switches S1-1 through S1-8 included in the switch group S1A.

One end of the switch S1-9 is electrically connected to the terminal E15, and the other end thereof is electrically connected to the terminal E11.

The switch S1-9 in the module M7 corresponds to an eighth switch of an embodiment of the disclosure.

The switches S1-1 through S1-9 of the switch group S1B are individually turned ON or OFF in accordance with the control signal Sig31 output from the control IC 33.

The circuit configuration of the module M8 is the same as that of the module M7. The terminal E14 of the module M8 is electrically connected to the terminal E13 of the module M7. The terminal A11 of the module M8 is electrically connected to the antenna ANT3.

The operation of the radio-frequency signal sending/receiving device 81 according to the fourth embodiment will be discussed below.

(T) Sending operation includes the cases of:
(T-1) sending by the antenna ANT2 (SRS); and
(T-2) sending by the antenna ANT4 (SRS).
(R) Receiving operation includes the cases of:
(R-1) receiving by the antenna ANT2 (regular); and
(R-2) receiving by the antenna ANT4 (regular).

The case of (T-1) sending by the antenna ANT2 (SRS) will be discussed below.

When sending the SRS sending signal $SRS_{T1}$ by the antenna ANT2 (SRS), in the module M7, the switches S1-1 through S1-4 and S1-6 through S1-9 are OFF and the switch S1-5 is ON in accordance with the control signal Sig31. In the module M2, the switch S3-1 is ON and the switch S3-2 is OFF in accordance with the control signal Sig3, while the switch S4-1 is ON and the switch S4-2 is OFF in accordance with the control signal Sig4.

The SRS sending signal $SRS_{T1}$ amplified by an external power amplifier is input into one end of the switch S1-5 via the terminal E14 on the left side of the module M7. After passing through the switch S1-5, the SRS sending signal $SRS_{T1}$ is input into one end of the switch S3-1 in the module M2 via the terminal E11 on the right side of the module M7 and the terminal R21 on the left side of the module M2. After passing through the switch S3-1, the SRS sending signal $SRS_{T1}$ is input into one end of the switch S4-1. After passing through the switch S4-1, the SRS sending signal $SRS_{T1}$ is input into one end of the band pass filter BPF21. The band pass filter BPF21 allows the SRS sending signal $SRS_{T1}$ to pass therethrough. The SRS sending signal $SRS_{T1}$ is then output to the antenna ANT2 via the terminal A21 on the right side of the module M2.

An arrow 91 in FIG. 10 indicates the transmission path through which the SRS sending signal $SRS_{T1}$ is transmitted. As indicated by the arrow 91, the SRS sending signal $SRS_{T1}$ is transmitted in order of terminal E14→switch S1-5→terminal E11→terminal R21→switch S3-1→switch S4-1→band pass filter BPF21→terminal A21→antenna ANT2.

The case of (T-2) sending by the antenna ANT4 (SRS) will be discussed below.

When sending the SRS sending signal $SRS_{T2}$ by the antenna ANT4 (SRS), in the module M8, the switches S1-1 through S1-8 are OFF and the switch S1-9 is ON in accordance with the control signal Sig31. In the module M4, the switch S3-1 is ON and the switch S3-2 is OFF in accordance with the control signal Sig3, while the switch S4-1 is ON and the switch S4-2 is OFF in accordance with the control signal Sig4.

The SRS sending signal $SRS_{T2}$ amplified by an external power amplifier is input into one end of the switch S1-9 via the terminal E15 on the left side of the module M8. After passing through the switch S1-9, the SRS sending signal $SRS_{T2}$ is input into one end of the switch S3-1 in the module M4 via the terminal E11 on the right side of the module M8 and the terminal R21 on the left side of the module M4. After passing through the switch S3-1, the SRS sending signal $SRS_{T2}$ is input into one end of the switch S4-1. After passing through the switch S4-1, the SRS sending signal $SRS_{T2}$ is input into one end of the band pass filter BPF21. The band pass filter BPF21 allows the SRS sending signal $SRS_{T2}$ to pass therethrough. The SRS sending signal $SRS_{T2}$ is then output to the antenna ANT4 via the terminal A21 on the right side of the module M4.

An arrow 93 in FIG. 10 indicates the transmission path through which the SRS sending signal $SRS_{T2}$ is transmitted. As indicated by the arrow 93, the SRS sending signal $SRS_{T2}$ is transmitted in order of terminal E15→switch S1-9→terminal E11→terminal R21→switch S3-1→switch S4-1→band pass filter BPF21→terminal A21→antenna ANT4.

The case of (R-1) receiving by the antenna ANT2 (regular) will be discussed below.

When a radio-frequency received signal $RX_1$ is received by the antenna ANT2 (regular), in the module M7, the switches S1-1 through S1-3 and S1-5 through S1-9 are OFF and the switch S1-4 is ON in accordance with the control signal Sig31. In the module M2, the switch S3-1 is OFF and the switch S3-2 is ON in accordance with the control signal Sig3, while the switch S4-1 is OFF and the switch S4-2 is ON in accordance with the control signal Sig4.

A radio-frequency received signal $RX_1$ is input from the antenna ANT2 into the other end of the band pass filter BPF21 via the terminal A21 on the right side of the module M2. The band pass filter BPF21 allows the radio-frequency received signal $RX_1$ to pass therethrough. The radio-frequency received signal $RX_1$ is then input into the other end of the switch S4-2. After passing through the switch S4-2, the radio-frequency received signal $RX_1$ is input into the input terminal of the low-noise amplifier LNA21. The low-noise amplifier LNA21 amplifies the radio-frequency received signal $RX_1$ and outputs it to the other end of the switch S3-2. After passing through the switch S3-2, the radio-frequency received signal $RX_1$ is input into the other end of the switch S1-4 in the module M7 via the terminal R21 on the left side of the module M2 and the terminal E11 on the right side of the module M7. After passing through the switch S1-4, the radio-frequency received signal $RX_1$ is output via the terminal E12 on the left side of the module M7.

An arrow 92 in FIG. 10 indicates the transmission path through which the radio-frequency received signal $RX_1$ is transmitted. As indicated by the arrow 92, the radio-frequency received signal $RX_1$ is transmitted in order of antenna ANT2→terminal A21→band pass filter BPF21→switch S4-2→low-noise amplifier LNA21→switch S3-2→terminal R21→terminal E11→switch S1-4→terminal E12.

The case of (R-2) receiving by the antenna ANT4 (regular) will be discussed below.

When a radio-frequency received signal $RX_2$ is received by the antenna ANT4 (regular), in the module M8, the switches S1-1 through S1-3 and S1-5 through S1-9 are OFF and the switch S1-4 is ON in accordance with the control signal Sig31. In the module M4, the switch S3-1 is OFF and the switch S3-2 is ON in accordance with the control signal Sig3, while the switch S4-1 is OFF and the switch S4-2 is ON in accordance with the control signal Sig4.

The radio-frequency received signal $RX_2$ is input from the antenna ANT4 into the other end of the band pass filter BPF21 via the terminal A21 on the right side of the module M4. The band pass filter BPF21 allows the radio-frequency received signal $RX_2$ to pass therethrough. The radio-frequency received signal $RX_2$ is then input into the other end of the switch S4-2. After passing through the switch S4-2, the radio-frequency received signal $RX_2$ is input into the input terminal of the low-noise amplifier LNA21. The low-noise amplifier LNA21 amplifies the radio-frequency received signal $RX_2$ and outputs it to the other end of the switch S3-2. After passing through the switch S3-2, the radio-frequency received signal $RX_2$ is input into the other end of the switch S1-4 in the module M8 via the terminal R21 on the left side of the module M4 and the terminal E11 on the right side of the module M8. After passing through the switch S1-4, the radio-frequency received signal $RX_2$ is output via the terminal E12 on the left side of the module M8.

An arrow 94 in FIG. 10 indicates the transmission path through which the radio-frequency received signal $RX_2$ is transmitted. As indicated by the arrow 94, the radio-frequency received signal $RX_2$ is transmitted in order of antenna ANT4→terminal A21→band pass filter BPF21→switch S4-2→low-noise amplifier LNA21→switch S3-2→terminal R21→terminal E11→switch S1-4→terminal E12.

The radio-frequency signal sending/receiving device 81 according to the fourth embodiment achieves the following advantages in addition to those obtained by the radio-frequency signal sending/receiving device 31 according to the second embodiment.

The radio-frequency signal sending/receiving device 81 uses an external power amplifier to amplify the SRS sending signals $SRS_{T1}$ and $SRS_{T2}$ without necessarily using the power amplifier PA11 and sends the SRS sending signals $SRS_{T1}$ and $SRS_{T2}$ by utilizing the existing antennas ANT2 and ANT4.

This enables the radio-frequency signal sending/receiving device 81 to easily add another communication band. That is, the radio-frequency signal sending/receiving device 81 receives the SRS sending signals $SRS_{T1}$ and $SRS_{T2}$ of another communication band from an external power amplifier and send them by using the existing antennas ANT2 and ANT4. The radio-frequency signal sending/receiving device 81 can make use of the existing antennas ANT2 and ANT4, thereby reducing the number of components, cost, and space required for the radio-frequency signal sending/receiving device 81.

The above-described embodiments are provided for facilitating the understanding of the disclosure, but are not intended to be exhaustive or to limit the disclosure to the precise forms disclosed. Modifications and/or improvements may be made without necessarily departing from the scope and spirit of the disclosure, and equivalents of the embodiments are also encompassed in the disclosure.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. A radio-frequency signal sending/receiving circuit comprising:
   first, second, third, fourth, and fifth terminals;
   a low-noise amplifier, an output terminal of the low-noise amplifier being electrically connected to the first terminal;
   a first switch, a first end of the first switch being electrically connected to an input terminal of the low-noise amplifier;
   a band pass filter, a first end of the band pass filter being electrically connected to a second end of the first switch, and a second end of the band pass filter being electrically connected to a first antenna via the fourth terminal;
   a power amplifier, an input terminal of the power amplifier being electrically connected to the second terminal;
   a second switch, a first end of the second switch being electrically connected to an output terminal of the power amplifier, and a second end of the second switch being electrically connected to the first end of the band pass filter;
   a third switch, a first end of the third switch being electrically connected to the output terminal of the power amplifier, and a second end of the third switch being electrically connected to the fifth terminal; and
   a fourth switch, a first end of the fourth switch being electrically connected to the third terminal, and a second end of the fourth switch being electrically connected to the fifth terminal.

2. The radio-frequency signal sending/receiving circuit according to claim 1, wherein, when a sending operation is performed with the first antenna:
   the second switch is configured to be ON, while the first, third, and fourth switches are configured to be OFF;
   the power amplifier is configured to amplify a radio-frequency sending signal input into the second terminal and to output the radio-frequency sending signal to the band pass filter via the second switch; and
   the band pass filter is configured to pass the radio-frequency sending signal and to output the radio-frequency sending signal to the first antenna via the fourth terminal.

3. The radio-frequency signal sending/receiving circuit according to claim 2, wherein, when a receiving operation is performed with the first antenna:
   the first switch is configured to be ON, while the second, third, and fourth switches are configured to be OFF;
   the band pass filter is configured to pass a radio-frequency received signal input from the first antenna via the fourth terminal, and to output the radio-frequency received signal to the low-noise amplifier via the first switch; and
   the low-noise amplifier is configured to amplify the radio-frequency received signal and to output the radio-frequency received signal from the first terminal.

4. The radio-frequency signal sending/receiving circuit according to claim 2, wherein, when a receiving operation is performed with a second antenna, the second antenna being different from the first antenna:
   the fourth switch is configured to be ON, while the first, second, and third switches are configured to be OFF; and
   a radio-frequency received signal input into the fifth terminal is output from the third terminal via the fourth switch.

5. The radio-frequency signal sending/receiving circuit according to claim 1, wherein, when a receiving operation is performed with the first antenna:
   the first switch is configured to be ON, while the second, third, and fourth switches are configured to be OFF;
   the band pass filter is configured to pass a radio-frequency received signal input from the first antenna via the fourth terminal, and to output the radio-frequency received signal to the low-noise amplifier via the first switch; and
   the low-noise amplifier is configured to amplify the radio-frequency received signal and to output the radio-frequency received signal from the first terminal.

6. The radio-frequency signal sending/receiving circuit according to claim 1, wherein, when a sending operation is performed with a second antenna, the second antenna being different from the first antenna:
   the third switch is configured to be ON, while the first, second, and fourth switches are configured to be OFF; and
   the power amplifier is configured to amplify a radio-frequency sending signal input into the second terminal and to output the radio-frequency sending signal from the fifth terminal via the third switch.

7. The radio-frequency signal sending/receiving circuit according to claim 1, wherein, when a receiving operation is performed with a second antenna, the second antenna being different from the first antenna:
   the fourth switch is configured to be ON, while the first, second, and third switches are configured to be OFF; and
   a radio-frequency received signal input into the fifth terminal is output from the third terminal via the fourth switch.

8. The radio-frequency signal sending/receiving circuit according to claim 1, further comprising:
   sixth and seventh terminals;
   a fifth switch, a first end of the fifth switch being electrically connected to the sixth terminal, and a second end of the fifth switch being electrically connected to the fifth terminal;
   a sixth switch, a first end of the sixth switch being electrically connected to the sixth terminal, and a second end of the sixth switch being electrically connected to the first end of the band pass filter; and
   a seventh switch, a first end of the seventh switch being electrically connected to the output terminal of the power amplifier, and a second end of the seventh switch being electrically connected to the seventh terminal.

9. The radio-frequency signal sending/receiving circuit according to claim 8, wherein, when a sending operation is performed with a third or fourth antenna, the third and fourth antennas being different from the first antenna:
   the seventh switch is configured to be ON, while the first, second, third, fourth, fifth, and sixth switches are configured to be OFF; and
   the power amplifier is configured to amplify a radio-frequency sending signal input into the second terminal and to output the radio-frequency sending signal from the seventh terminal via the seventh switch.

10. The radio-frequency signal sending/receiving circuit according to claim 8, further comprising:
    an eighth terminal; and an eighth switch, a first end of the eighth switch being electrically connected to the eighth terminal, and a second end of the eighth switch being electrically connected to the fifth terminal.

11. The radio-frequency signal sending/receiving circuit according to claim 10, wherein, when a radio-frequency sending signal is input into the sixth terminal, the fifth switch is configured to be ON, while the first, second, third, fourth, sixth, seventh, and eighth switches are configured to be OFF.

12. The radio-frequency signal sending/receiving circuit according to claim 10, wherein, when a radio-frequency sending signal is input into the eighth terminal, the eighth switch is configured to be ON, while the first, second, third, fourth, fifth, sixth, and seventh switches are configured to be OFF.

13. A radio-frequency signal sending/receiving circuit comprising:
  first and second terminals;
  a first switch, a first end of the first switch being electrically connected to the first terminal;
  a second switch, a first end of the second switch being electrically connected to the first terminal;
  a third switch, a first end of the third switch being electrically connected to a second end of the first switch;
  a band pass filter, a first end of the band pass filter being electrically connected to a second end of the third switch, and a second end of the band pass filter being electrically connected to a second antenna or a third antenna via the second terminal, the third antenna being different than the second antenna;
  a low-noise amplifier, an output terminal of the low-noise amplifier being electrically connected to a second end of the second switch; and
  a fourth switch, a first end of the fourth switch being electrically connected to an input terminal of the low-noise amplifier, and a second end of the fourth switch being electrically connected to the first end of the band pass filter.

14. The radio-frequency signal sending/receiving circuit according to claim 13, wherein, when a sending operation is performed with the second antenna:
  the first and third switches are configured to be ON, while the second and fourth switches are configured to be OFF; and
  the band pass filter is configured to pass a radio-frequency sending signal input into the first terminal, and to output the radio-frequency sending signal to the second antenna via the second terminal.

15. The radio-frequency signal sending/receiving circuit according to claim 14, wherein, when a receiving operation is performed with the second antenna:
  the second and fourth switches are configured to be ON, while the first and third switches are configured to be OFF;
  the band pass filter is configured to pass a radio-frequency received signal input from the second antenna via the second terminal, and to output the radio-frequency received signal to the low-noise amplifier via the fourth switch; and
  the low-noise amplifier is configured to amplify the radio-frequency received signal and to output the radio-frequency received signal from the first terminal via the second switch.

16. The radio-frequency signal sending/receiving circuit according to claim 13, wherein, when a receiving operation is performed with the second antenna:
  the second and fourth switches are configured to be ON, while the first and third switches are configured to be OFF;
  the band pass filter is configured to pass a radio-frequency received signal input from the second antenna via the second terminal, and to output the radio-frequency received signal to the low-noise amplifier via the fourth switch; and
  the low-noise amplifier is configured to amplify the radio-frequency received signal and to output the radio-frequency received signal from the first terminal via the second switch.

17. The radio-frequency signal sending/receiving circuit according to claim 13, further comprising:
  third, fourth, and fifth terminals;
  a fifth switch, a first end of the fifth switch being electrically connected to the third terminal, and a second end of the fifth switch being electrically connected to the fifth terminal;
  a sixth switch, a first end of the sixth switch being electrically connected to the fourth terminal, and a second end of the sixth switch being electrically connected to the fifth terminal; and
  a seventh switch, a first end of the seventh switch being electrically connected to the fourth terminal, and a second end of the seventh switch being electrically connected to the first end of the band pass filter,
  wherein, the third antenna, but not the second antenna, is electrically connected to the second terminal.

18. The radio-frequency signal sending/receiving circuit according to claim 17, wherein, when a sending operation is performed with the third antenna:
  the seventh switch is configured to be ON, while the first, second, third, fourth, fifth, and sixth switches are configured to be OFF; and
  the band pass filter is configured to pass a radio-frequency sending signal input into the fourth terminal, and to output the radio-frequency sending signal to the third antenna via the second terminal.

19. The radio-frequency signal sending/receiving circuit according to claim 17, wherein, when a sending operation is performed with a fourth antenna, the fourth antenna being different from the third antenna:
  the sixth switch is configured to be ON, while the first, second, third, fourth, fifth, and seventh switches are configured to be OFF; and
  a radio-frequency sending signal input into the fourth terminal is output from the fifth terminal via the sixth switch.

20. A radio-frequency signal sending/receiving device comprising:
  first and second radio-frequency signal sending/receiving circuits,
  the first radio-frequency signal sending/receiving circuit comprising:
    first, second, third, fourth, and fifth terminals;
    a low-noise amplifier, an output terminal of the low-noise amplifier being electrically connected to the first terminal;
    a first switch, a first end of the first switch being electrically connected to an input terminal of the low-noise amplifier;
    a band pass filter, a first end of the band pass filter being electrically connected to a second end of the first switch, and a second end of the band pass filter being electrically connected to a first antenna via the fourth terminal;

a power amplifier, an input terminal of the power amplifier being electrically connected to the second terminal;

a second switch, a first end of the second switch being electrically connected to an output terminal of the power amplifier, and a second end of the second switch being electrically connected to the first end of the band pass filter;

a third switch, a first end of the third switch being electrically connected to the output terminal of the power amplifier, and a second end of the third switch being electrically connected to the fifth terminal; and a fourth switch, a first end of the fourth switch being electrically connected to the third terminal, and a second end of the fourth switch being electrically connected to the fifth terminal, the second radio-frequency signal sending/receiving circuit comprising:

first and second terminals of the second radio-frequency signal sending/receiving circuit;

a first switch of the second radio-frequency signal sending/receiving circuit, a first end of the first switch of the second radio-frequency signal sending/receiving circuit being electrically connected to the first terminal of the second radio-frequency signal sending/receiving circuit;

a second switch of the second radio-frequency signal sending/receiving circuit, a first end of the second switch of the second radio-frequency signal sending/receiving circuit being electrically connected to the first terminal of the second radio-frequency signal sending/receiving circuit;

a third switch of the second radio-frequency signal sending/receiving circuit, a first end of the third switch of the second radio-frequency signal sending/receiving circuit being electrically connected to a second end of the first switch of the second radio-frequency signal sending/receiving circuit;

a band pass filter of the second radio-frequency signal sending/receiving circuit, a first end of the band pass filter of the second radio-frequency signal sending/receiving circuit being electrically connected to a second end of the third switch of the second radio-frequency signal sending/receiving circuit, a second end of the band pass filter of the second radio-frequency signal sending/receiving circuit being electrically connected to a second antenna via the second terminal of the second radio-frequency signal sending/receiving circuit;

a low-noise amplifier of the second radio-frequency signal sending/receiving circuit, an output terminal of the low-noise amplifier of the second radio-frequency signal sending/receiving circuit being electrically connected to a second end of the second switch of the second radio-frequency signal sending/receiving circuit; and a fourth switch of the second radio-frequency signal sending/receiving circuit, a first end of the fourth switch of the second radio-frequency signal sending/receiving circuit being electrically connected to an input terminal of the low-noise amplifier of the second radio-frequency signal sending/receiving circuit, and a second end of the fourth switch of the second radio-frequency signal sending/receiving circuit being electrically connected to the first end of the band pass filter of the second radio-frequency signal sending/receiving circuit, wherein the fifth terminal of the first radio-frequency signal sending/receiving circuit and the first terminal of the second radio-frequency signal sending/receiving circuit are electrically connected to each other.

* * * * *